United States Patent
Kamatani et al.

(10) Patent No.: US 6,906,874 B2
(45) Date of Patent: Jun. 14, 2005

(54) METHOD AND APPARATUS FOR MAGNETIC TRANSFER

(75) Inventors: Akito Kamatani, Kanagawa-ken (JP); Tsuneo Inui, Kanagawa-ken (JP); Masashi Aoki, Kanagawa-ken (JP); Masakazu Nishikawa, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 479 days.

(21) Appl. No.: 10/121,679

(22) Filed: Apr. 15, 2002

(65) Prior Publication Data

US 2002/0167744 A1 Nov. 14, 2002

(30) Foreign Application Priority Data

| Apr. 16, 2001 | (JP) | ................................. | 2001-116931 |
| Apr. 16, 2001 | (JP) | ................................. | 2001-116935 |
| May 11, 2001 | (JP) | ................................. | 2001-141603 |
| May 15, 2001 | (JP) | ................................. | 2001-144292 |
| May 15, 2001 | (JP) | ................................. | 2001-144297 |
| Jul. 17, 2001 | (JP) | ................................. | 2001-216727 |
| Sep. 28, 2001 | (JP) | ................................. | 2001-302231 |

(51) Int. Cl.⁷ .................................................. G11B 5/86
(52) U.S. Cl. ............................. 360/17; 360/16; 360/15
(58) Field of Search ............................. 360/15, 16, 17

(56) References Cited

U.S. PATENT DOCUMENTS 6,347,016 B1    2/2002   Ishida et al.
6,469,848 B1   10/2002   Hamada et al.
2004/0109252 A1 * 6/2004  Hashi et al. ................... 360/17

FOREIGN PATENT DOCUMENTS

| EP | 0 915 456 A1 | 5/1999 |
| JP | 63-183623 | 7/1988 |
| JP | 5-87617 A | 4/1993 |
| JP | 10-40544 | 1/1998 |
| JP | 10-40554 | 2/1998 |
| JP | 10-269566 | 10/1998 |
| JP | 11-25455 A | 1/1999 |
| JP | 11-175973 | 7/1999 |
| JP | 2000-132831 | 5/2000 |
| JP | 2000-285367 | 10/2000 |
| JP | 2000-285637 | 10/2000 |
| WO | WO 00/65580 A1 | 11/2000 |

* cited by examiner

Primary Examiner—David Hudspeth
Assistant Examiner—Varsha A. Kapadia
(74) Attorney, Agent, or Firm—Sughrue Mion, PLLC

(57) ABSTRACT

A magnetic transfer wherein the exchange of master mediums is made easy to perform is provided, whereby the operational efficiency and transfer efficiency are improved, leading to an overall improvement in productivity in the manufacture of preformatted slave mediums. A master fixing base for determining and supporting the position of a master medium, which bears transfer data, and a conjoining apparatus for conjoining the master medium and the slave medium that is to receive the transfer therefrom are provided. The master medium is exchanged along with the master fixing base. It is preferable that a cleaning means be provided.

3 Claims, 11 Drawing Sheets

METHOD AND APPARATUS FOR MAGNETIC TRANSFER

BACKGROUND OF THE INVENTION

1. Field of the Invention

The present invention relates to a magnetic transfer apparatus for magnetically transferring the data borne on a master medium to a slave medium.

2. Description of the Related Art

A magnetic transfer method is a method comprising the steps of: bringing a master medium, on which a transfer pattern has been formed, into close contact with a slave medium, which has been provided with a magnetic recording portion for receiving the transfer, to form a conjoined body; and applying a transfer magnetic field to the conjoined body so as to transfer and record the magnetic pattern corresponding to the transfer data (such as servo data) onto the slave medium.

This magnetic transfer method has been described in Japanese Unexamined Patent Publication Nos. 63(1988)-183623, 10(1998)-40544, and 10(1998)-269566, for example.

However, when performing magnetic transfers according to the magnetic transfer method described above, the surface of the master medium becomes littered with dust and other debris that becomes attached thereto through the repeated usage thereof. This dust and debris can consist of foreign matter originating in the surrounding environment, which becomes lodged between the master and slave medium, or material originating from the master and/or slave medium, which is scraped from either surface thereof, respectively, when said master medium and said slave medium are brought into close contact.

If a magnetic transfer is performed when there is dust or other debris attached to the surface of the master medium, adequate contact between the area of the surface of the master medium centering on the dust or debris attached thereto and the surrounding vicinity thereof and the corresponding area of the slave medium cannot be ensured; whereby a pattern of a predetermined signal level cannot be transferred, and the transfer quality becomes deteriorated thereby. For cases in which the recorded signal data is a servo signal, there is a problem in that an adequate tracking function cannot be obtained, and the reliability of the transfer is deteriorated thereby.

By repeatedly bringing a master medium, onto the surface of which dust and/or debris has become attached, into close contact with slave mediums, the attachment strength of the dust and/or debris to the surface of the master medium is heightened; whereby deficiencies in pattern transfer of the same or greater magnitude are repeated during the performance of magnetic transferences to slave mediums subsequently brought into close contact with said master medium, and said dust and/or debris becomes the cause of multiple faulty products. Further, the surface of the master medium becomes deformed by this attached debris, and a problem arises in that the proper functionality thereof is lost.

Further, in this regard, cleaning technology, wherein a cleaning disk to which a cleaning pad has been attached is pressed against the surface of the master medium to remove dust and debris that have become attached thereto has been proposed as described in Japanese Unexamined Patent Publication No. 2000-285367, for example. Further, removal of attached dust and debris by washing can also be considered.

Still further, for cases in which the slave medium is a disk shaped medium such as a hard disk or a high-density flexible disk, a transfer magnetic field is applied to a conjoined body formed of a slave medium and a master medium(s) brought into close contact with one or both surfaces of the slave medium, by use of a magnetic field generating means employing an electromagnetic apparatus or a permanent magnet apparatus (es), which is disposed on one or both sides of the conjoined body. An important issue regarding the improvement of the transference quality occurring in the magnetic transference relates to the bringing into close contact the master medium and the slave medium so that there is no gap whatsoever therebetween. That is to say, if there are deficiencies in the contact between the respective surfaces of the master medium(s) and the slave medium, regions on the slave medium onto which the magnetic transfer has not been effected occur; whereby the quality of the transferred and recorded signal is deteriorated due to the occurrence of signal omissions in the magnetic data transferred to the slave medium. For cases in which the recorded signal is a servo signal, a problem arises in that an adequate tracking function cannot be obtained, whereby the reliability of the magnetic transfer is deteriorated.

Generally speaking, with regard to magnetic storage mediums, there is a demand for increased storage capacity and low cost. Further desired are so-called high-speed access mediums, which are capable of advantageously reading out the data of a desired location in a short time. Examples of these mediums include hard disks and HD (high-density) flexible disks; so-called tracking servo technology, wherein the magnetic head accurately scans a narrow width track to achieve a high S/N ratio, plays a substantial role in attaining the high storage capacity thereof. A servo signal, address data signal, replay clock signal, etc., used for tracking within a certain interval occurring in one rotation of the disk are "preformatted", that is, recorded on the disk in advance.

The magnetic head is set so as to be capable of reading out the preformatted signals and correcting its position thereby, whereby the magnetic head can accurately scan the track. According to the currently available preformatting technologies, one disk at a time, one track at a time is recorded by use of a specialized servo recording apparatus.

However, because the servo recording apparatuses are expensive and the preformatting operation consumes a considerable amount of time, this process accounts for a significant portion of the manufacturing costs incurred in producing preformatted disks; a reduction of said costs is desirable.

Meanwhile, methods of utilizing magnetic transfer to achieve this objective, not writing one preformatting track at a time, have been proposed. Magnetic transfer methods have been proposed in, for example, Japanese Unexamined Patent Publication Nos. 63(1988)-183623, 10(1998)-40544, and 10(1998)-269566. According to these magnetic transfer technologies, because a master medium and a slave medium are brought into close contact to form a conjoined body, and a transfer magnetic field is applied thereto, whereby a magnetic pattern corresponding to the data (e.g., a servo signal) borne on the master medium is transferred to the slave medium, the preformatting can be performed without changing the relative positions of the master medium and the slave medium—that is, while the two media remain stationary; not only is it possible to perform an accurate recording of the preformat data, it becomes possible to do so in an extremely short time.

Further, for cases in which the slave medium is a disk shaped medium such as a hard disk or a high-density flexible disk, a transfer magnetic field is applied to a conjoined body formed of a slave medium and a master medium(s) brought into close contact with one surface or both surfaces of the slave medium, by use of a magnetic field generating means employing an electromagnetic apparatus or a permanent magnet apparatus(es), which is disposed on one or both sides of the conjoined body. When the transfer magnetic field is applied, in order to apply the magnetic transfer current in the track direction of the slave medium, the conjoined body, formed of the master medium(s) and the slave medium that have been brought into and maintained in close contact, or the magnetic field is rotated relative to each other, whereby a magnetic pattern is transferred to the track on the entire circumference of the disk shaped slave medium.

An important issue regarding the performance of this magnetic transfer relates to the accurate positioning of the slave medium and the master medium. In particular, regarding the slave medium, which is a hard disk or the like, the rotational center of the drive apparatus into which the slave medium is to be loaded after a magnetic pattern has been transferred thereto must be accurately aligned with the center position of the magnetic pattern that has been transferred and recorded onto said slave medium. In this regard, it is difficult to manufacture the master medium so that the center of the pattern of the transfer data and the center position of the body of the master medium itself are accurately aligned; for example, there are cases in which even if a hole for determining the center position has been formed in the master medium, the accuracy of the process whereby said hole has been formed has been insufficient.

Regarding the points described above, an image apparatus wherein the positions of the master medium and the slave medium are determined when said master and slave medium are brought into close contact is described in Japanese Unexamined Patent Publication No. 11(1999)-175973. More specifically, after first setting the slave medium into a setting flange, a master medium, which is provided with a transparent portion having a marker corresponding to the transfer pattern is loaded thereon, and the position of the master medium is adjusted while the position of the marker and the position of the slave medium are observed by use of an image apparatus, so as to be aligned, and then said master and slave medium are brought into close contact.

Here, when the master medium is to be cleaned, the master medium is removed from the magnetic transfer apparatus, and each type of dust and debris attached to the surface thereof is removed; because the master medium must then be again loaded into the magnetic transfer apparatus, a problem arises in that the operation rate of the transfer is reduced due to the difficulty of properly positioning the master medium.

In particular, because the accuracy obtained by a simple positioning is inadequate due to the fact that the transfer pattern, such as a servo pattern or the like, formed on the master medium becomes finer as the recording capacity thereof is increased, and the ability of the predetermined functions thereof to be accurately performed cannot be ensured if the center position of the transfer pattern and the rotational center of the slave medium are not aligned with a high degree of accuracy, a troublesome operation wherein the servo pattern or the like must be observed by use of a measuring microscope or the like and aligned is required. Therefore, because time is consumed in removing and reloading the master medium, production inefficiencies arise.

Further, there is also a fear that airborne dust will become adhered to the surface of the master medium or that dust adhering to the hands of an operator or to components of the apparatus coming into contact with the master medium will become transferred to the surface of the master medium when the master medium is being conveyed or loaded after the cleaning process has been performed thereon; thus causing deficiencies in the magnetic transfer.

The present invention has been developed in view of the foregoing problems, and it is an objective of the present invention to provide a magnetic transfer apparatus wherein the exchange of the master medium can be performed easily, the transfer operation rate is improved, and more efficient production is realized.

Further, according to current magnetic transfer apparatuses, in order to improve the contact between the master medium and the slave medium, a pressing means is employed for applying pressure to the master medium so as to press the slave medium against the master medium, and for removing the air between the respective contact surfaces of the master and slave mediums by use of suction so as to reduce the quantity of air remaining therebetween.

At this time, a lower chamber, in which the master medium is held in position, and an upper chamber, in which the slave medium that is to be pressed against the master medium is held in position are provided; wherein the upper surface of the lower chamber and the lower surface of the upper chamber are provided with a sealing element such as an O-ring by which both of said surfaces are brought into close contact and hermetically sealed. In this configuration, if the degree of vacuum within the interior is increased, the sealing element deforms, the pressure increases, and the degree of vacuum and the contact pressure cannot each be controlled independently. Therefore, an optimal degree of vacuum and an optimal contact pressure cannot be obtained, leading to contact deficiencies, and causing a deterioration of the durability of the master medium.

That is to say, if the pressure exerted by the slave medium against the master medium is increased, a problem arises in that the micro uneven pattern, which corresponds to the transfer data, formed on the master medium becomes more prone to being damaged, and the durability of the surface thereof is also adversely affected. Further, if the degree of vacuum is reduced, it becomes more likely that the quantity of air remaining between the contact surfaces will increase.

SUMMARY OF THE INVENTION

The present invention has been developed in view of the foregoing circumstances, and it is an objective of the present invention to provide a magnetic transfer apparatus wherein the degree of vacuum and the conjoinment pressure occurring when the master medium and the slave medium have been brought into close contact can be optimized, whereby the contact property between the respective contact surfaces can be improved and the magnetic transfer can be performed favorably.

Further, although technology has been proposed, as described in Japanese Unexamined Patent Publication No. 7(1995)-78337, wherein an elastic body is used to press against the entirety of the back surface of the master medium under uniform pressure by a pressure contacting means in order to improve the contact between the master medium and the slave medium, according to the application of this type of means as a solution, because the entire surface of the slave medium is pressed against by the elastic body, problems arise such as the overall pressure required for effecting the close contact state becomes high, the apparatus must be large, etc. due to the fact that For example, in a case in which the pressure required to ensure close contact between the master medium and the slave medium is 1–50 N/cm$^2$ (0.1–5.0 kg/cm$^2$), and the slave medium is a 3.5 inch disk, in order to obtain the required pressure, an overall pressure of 70–3540N (7–354 kg) is required. The magnetic transfer apparatus must be designed so as to be able to withstand this load, whereby the size of the apparatus becomes larger. In a case, for example, in which a ring shaped electromagnetic head is employed as a magnetic transfer apparatus for applying the transfer magnetic field, the thickness of the conjoining apparatus employed for bringing and maintaining the master and the slave medium into the close contact state under pressure is increased, whereby it becomes difficult to dispose the magnetic poles for applying the magnetic field adjacent to the respective contact surfaces of the master medium and the slave medium; the size of the magnetic field that is leaked becomes larger, and a magnetic field of a predetermined intensity distribution cannot be applied, resulting in deficiencies in the magnetic transfer.

Further, even if the master medium is pressed against under uniform pressure by the entire surface of the slave medium, in actuality it is difficult to achieve a uniform close contact state across the entire surfaces thereof, due to various surface distortions and air remaining between the respective contact surfaces, whereby contact deficiencies are caused on portions of said contact surfaces, giving rise to transfer deficiencies. In particular, it has become clear that for cases in which the transfer pattern corresponding to the transfer data is not formed uniformly across the entire surface of the master medium, such as that occurring in the case of the servo pattern P shown in FIG. 7B described below and which is formed in a radial pattern on portions of the surface of the master medium, that if good contact can be ensured for the portions on which this pattern occurs a favorable magnetic transfer can be obtained.

In view of this problem, it is a further object of the present invention to provide a magnetic transfer elastic pressing member for ensuring a close contact pressure between the master and slave mediums, which is not excessive when the magnetic transfer is to be performed, so as to improve the contact therebetween and thus facilitate an improvement in the quality of the transfer signal.

Further, another important issue regarding the performance of a magnetic transfer such as that described above relates to the necessity of highly accurate position matching of the respective contact surfaces of the master and slave mediums. In particular, the center position of the magnetic pattern transferred and recorded on the slave medium must be matched with a high degree of accuracy to the rotational center of the drive apparatus into which said slave medium is loaded after the magnetic transfer has been performed; for cases in which the transfer signal is a servo signal, there is a fear that an adequate tracking function will not be obtained if there is a large misalignment between these positions.

As to the matching of the positions of the master and slave mediums, a configuration wherein the hole at the center position of the master medium and the hole at the center position of the slave medium are emplaced onto a center pin provided on a holder is structurally favorable.

For cases in which position matching is performed as described above, if the center positions of the master and slave mediums are misaligned, in addition to the above-described problem, there is a fear that the master medium and/or the slave medium be damaged due to the center position hole of the master slave medium being impacted against the side of the center pin of the holder when both the master and slave mediums are loaded thereon. Further, if the center positions of the master and slave mediums are misaligned, there is also a possibility that the contact pressure applied when the master medium and the slave medium are conjoined will not be uniform, whereby it becomes difficult to obtain a uniform close contact state around the entire circumference. Still further, there are also a problems related to the durability, and the like, of the master and slave mediums due to the fact that a misaligned edge portion that is brought into close contact with an end portion of the respective counterpart medium thereof can cause damage thereto.

The present invention has been developed in view of these types of problems, and it is a still further object of the present invention to provide a magnetic transfer apparatus capable of conjoining a master medium and a slave medium so that a favorable magnetic transfer can be performed therebetween.

Further, according to the positional adjustment of the master medium as described above, because an operation is performed to match the center positions of the master and slave mediums by use of an image apparatus each time the slave medium is exchanged and a magnetic transfer is performed, a problem arises in that a loss of efficiency in the magnetic transfer is incurred due to the time consumed by this position matching operation.

Generally, a plurality of slave mediums are sequentially subjected to a magnetic transfer by a single master medium. In order to improve the efficiency of the magnetic transfer, it is preferable that: the master medium be set in the magnetic transfer apparatus in advance; the slave medium be conveyed to the close contact position of the master medium; the master medium and the slave medium are conjoined to form a conjoined body; and then a transfer magnetic field is applied to the conjoined body. Here, for cases in which the slave medium is a hard disk or the like, a central aperture is provided for the positioning thereof on the rotational axis of the drive apparatus, and by matching the center position of the central aperture and that of the rotational center, the central aperture is supported by the slave medium support axis (the positioning axis), whereby the accuracy of the position can be ensured.

The present invention has been developed in view of these types of points, and it is a yet further object of the present invention to provide a magnetic transfer method wherein the position matching occurring when a master medium and a slave medium are to be conjoined is improved, and an increase in the productivity of the magnetic transfer is gained thereby.

Further, as to the application of the transfer magnetic field, two methods are considered: a first method, wherein the transfer magnetic field applying apparatus is fixed in place and the conjoined body formed by the master medium and the slave medium that have been brought into and maintained in the close contact state is rotated; and a second method, wherein the conjoined body formed by the master medium and the slave medium that have been brought into and maintained in the close contact state is fixed in place and the transfer magnetic field application apparatus is rotated.

If the second method is utilized, for cases in which the transfer magnetic field application apparatus is an electromagnet apparatus or the like, the apparatus includes a rotational driving mechanism in addition to the magnetic field generating mechanism and becomes very large, and is therefore disadvantageous from the standpoints of the cumbersomeness thereof as equipment, the cost, and the like. Although the first method does not have the problems described above which occurs in the second method, when the mechanism in which it is possible to exchange the master medium and the slave medium is rotated as an integral unit wherein the master medium and the slave medium are maintained in the conjoined state, the rotational center of the rotational axis thereof must be aligned with a high degree of accuracy.

For example, the pressing base plate on which the master medium is supported is moved into contact with the rotational base plate on which the slave medium is supported so as to conjoin the master medium and the slave medium and form a conjoined body thereby; if a misalignment occurs between the rotational centers of the pressing base plate and the rotational base plate when said pressing base plate and rotational plate are rotated as an integral unit, microscopic slippage occurs between the master medium and the slave medium, and an accurate magnetic transfer cannot be achieved. Further, for a case in which the contact between the master medium and the slave medium is strong and no slippage occurs therebetween when the rotation operation is performed, although the accuracy of the transfer can be maintained, with frequent use, problems arise which impact the durability of the apparatus, such as increases in driving resistance, wear of components, and reduction in strength due to fatigue. This is because the misalignment of the rotational centers is absorbed by repetitive deformation of the axis, bearings and the like of the apparatus.

Further, in performing a magnetic transfer, it is necessary that the master and slave mediums be conjoined while in the state in which the rotational center positions of both a single recording surface of the slave medium or both recording surfaces of the slave medium and the transfer data bearing surface of the magnetic transfer master medium(s) are accurately matched; therefore, it is desirable that this operation is capable of being performed easily.

The present invention has been developed in view of the points described above, and it is a still yet further object of the present invention to provide a magnetic transfer method wherein the operations of conjoining and then rotating a master medium and a slave medium are performed so that no slippage occurs between said master and slave mediums.

The magnetic transfer apparatus according to the present invention comprises: a master fixing base for positioning and supporting a position of the master medium bearing a data signal; and a conjoining apparatus for bringing a slave medium that is to receive the transfer of the data signal from the master medium into a state of close contact to form a conjoined body; wherein the master medium is exchanged as a whole with each master fixing base.

The conjoining apparatus is provided with a pressing member for pressing the slave member against the master medium, which is supported in the transfer position by the master fixing base, so as to conjoin said master and slave medium to form a conjoined body.

Further, it is desirable that a plurality of the master fixing bases, and a conveyor for sequentially conveying the master fixing bases to the transfer position are further provided. In this configuration, a master medium is fixed into position in each master fixing base in advance, and each master fixing base supporting a master medium is then set in the conveyor, and the master medium is exchanged along with each master fixing base.

It is preferable that a master medium cleaning means is provided for cleaning dust and debris attached to the surface of the master medium held in the master fixing base. Here, the slave medium can also be cleansed by use of a cleaning means, which can be the aforementioned master medium cleaning means or a separately provided cleaning means. It is preferable that the cleaning means employ an ultrasound washing head; additionally, a gas bombarded with ultrasound vibrations, an ion air stream (de-electrified air), clean air, or the like may be blown onto the surface of the slave medium to remove dust and debris therefrom. The master medium and the slave medium are cleaned directly before the magnetic transfer is to be performed, and the master medium is subjected to further cleaning as required directly after contact.

A cleaning apparatus for cleaning the master fixing base removed from the conveyor together with the master medium can also be provided. As to this cleaning apparatus, an apparatus employing: a liquid wash, wherein the surface of the master and/or slave medium is washed with liquid bombarded with mega sonic vibrations by use of an ultrasound head; an ultrasound vibration wash, wherein the surface of the master and/or slave medium is subjected to ultra sound vibrations, by use of an ultrasound vibration head, within a liquid contained in a wash vat or within the air; blowing of an air stream that has been bombarded by use of ultrasound vibrations onto the surface of the master and/or slave medium; a glide cleaning, performed by a glide head, after which an ultrasound washing is performed thereon; an incineration wash, wherein the surface of the master and/or slave medium is subjected to the emissions from an excimer laser; a plasma cleaning; or the like, can be employed thereas.

Note that the slave medium can be positioned and supported in the holder, and the slave medium and the holder may be subjected to the cleaning process together, as the process preceding the magnetic transfer.

Further, the magnetic transfer apparatus according to the present invention comprises: a conjoining apparatus for hermetically sealing and conjoining a magnetic transfer master medium bearing a data signal and a slave medium having a magnetic recording portion for receiving the magnetic transfer from the master medium; a pressure applying means for applying pressure that presses the slave medium against the master medium; a depressurizing means for reducing the pressure occurring in the space between the master medium and the slave medium within the conjoining apparatus to obtain a degree of vacuum therebetween; and a magnetic field applying means for applying a transfer magnetic field; wherein, it is desirable that the conjoinment pressure applied by the pressure applying means when conjoining the master and the slave medium, and the degree of vacuum obtained by the depressurizing means are each controlled independently.

Here, it is desirable that the pushing pressure be controlled in the state in which the degree of vacuum has been controlled beforehand. For example, the degree of vacuum is controlled by the quantity of expelled air, and then the pushing pressure is controlled by the positions of the upper and lower chambers.

Note that when the master medium and the slave medium are being conjoined, it is preferable that the degree of vacuum in their environs be controlled to within the range of 50–100 kPa and that the conjoining pressure be controlled to 0.01–49N/cm$^2$ (1–5000 gf/cm$^2$).

Further, another magnetic transfer apparatus according to the present invention comprises: a conjoining apparatus for hermetically sealing and conjoining a magnetic transfer master medium bearing a data signal and a slave medium provided with a magnetic recording portion for receiving the magnetic transfer from the master medium; a pressure applying means for applying pressure that presses the slave medium against the master medium; a depressurizing means for reducing the pressure occurring in the space between the master medium and the slave medium within the conjoining apparatus to obtain a degree of vacuum therebetween; and a magnetic field applying means for applying a transfer magnetic field; wherein, it is desirable that the conjoining apparatus be provided with a lower chamber and an upper chamber, which is movable in the contact and separation directions relative to said lower chamber, and a seal element for sealing the respective contact surfaces of both of said chambers provided in a slidably contacting manner in a direction parallel to the contact and separation direction of said chambers so as to hermetically seal the interior space enclosed by said chambers in the conjoined state.

Further, it is desirable that the magnetic transfer elastic pressing member according to the present invention is an elastic member for pressing against the back surface of a slave medium for receiving a magnetic transfer from a master medium to bring the data bearing surface of the master medium into close contact with a surface of the slave medium, when a transfer magnetic field is to be applied to perform a magnetic transfer; wherein the pressing surface that contacts the back surface of the slave medium is formed as an uneven pattern for pressing mainly against the portion thereof corresponding to the portion of the recording surface of slave medium conjoined with the transfer pattern of the master medium.

In this regard, it is advantageous that the elastic pressing member comprises: an inner ring portion on the inner circumference thereof; an outer ring portion on the outer circumference thereof; and that a plurality of radial portions corresponding to the servo pattern of the master medium concatenated with said inner ring portion and said outer ring portion is formed as the protrusion pressure portions that connect with the back surface of the slave medium.

Note that the magnetic transfer method consists of the steps of: pressing, by use of an elastic pressing member, the back surface of a slave medium having a magnetic recording portion for receiving the transfer from a master medium having formed on a portion of the substrate thereof a transfer pattern corresponding to the data to be transferred, mainly against the portion corresponding to the transfer portion to conjoin said master medium and said slave medium; and applying a transfer magnetic field to said conjoined body to transfer the magnetic pattern, which corresponds to the transfer pattern, from the master medium to the slave medium.

When performing the magnetic transfer, it is advantageous that the initial magnetization of the slave medium is performed in advance in the planar track direction, in the case of planar recording, or an initial magnetization current is applied in the perpendicular direction, in the case of perpendicular recording; after which the initially magnetized slave medium is conjoined with the master medium, and a transfer magnetic current is applied in the track direction in the direction opposite to that in which the initial magnetization current has been applied, or in the perpendicular direction, to perform the magnetic transfer.

Further, the magnetic transfer apparatus of the present invention can be an apparatus for: conjoining both recording surfaces of a disk shaped slave medium that is to receive a magnetic transfer with the respective data bearing surface, on which a pattern corresponding to the data that is to be transferred has been formed, of two disk shaped master mediums, each of which is disposed facing one recording surface of said slave medium, and loading the conjoined body formed by said conjoined mediums into a holder and then applying the transfer magnetic field thereto to perform the magnetic transfer; wherein the center positions of the master mediums and the slave medium are matched by use of a center pin provided on the holder, and it is desirable that the amount of eccentricity of the center positions of said master and slave medium is less than or equal to 100 um.

At this point, it is more desirable that the eccentricity of the center positions of said master and slave medium is less than or equal to 50 um.

Further, according to the magnetic transfer method of the present invention, wherein the data bearing surface of a disk shaped master medium on which a pattern corresponding to the data to be transferred is brought into close contact with a recording surface of a slave medium formed of a disk shaped magnetic recording medium for receiving the transfer from said master medium to form a conjoined body, and a transfer magnetic field is applied to said conjoined body to perform a magnetic transfer; it is desirable that the master medium be adjustably positioned on the outer circumference of the slave medium support axis for determining and supporting the position of the central aperture which has been opened on the slave medium, and that after the center position of the pattern formed on said master medium has been matched to the position of the center position of the slave support axis and fixed in the matched position, the slave medium is supplied to the slave support axis and the position matching between the master and slave medium is performed.

At this point, it is desirable that the position of the pattern of the master medium is visually measured by use of a measuring microscope, and that the center position of the pattern of the master medium is then matched with the center position of the slave support axis. Further, a position matching mark can be provided along with the transfer pattern formed on the master medium; said mark can then be visually measured by use of a measuring microscope, and the center position of the pattern of the master medium matched with the center position of the slave support axis.

Further, the magnetic transfer apparatus implementing the magnetic transfer method according to the present invention is an apparatus for bringing into close contact the data bearing surface of a disk shaped master medium on which a pattern corresponding to the data to be transferred has been formed, with a recording surface of a slave medium formed of a disk shaped magnetic recording medium for receiving the transfer from said master medium to form a conjoined body, and applying a transfer magnetic field to said conjoined body to perform a magnetic transfer; further comprising a first base plate on the master medium side, a second base plate on the slave medium side, a slave support axis for determining and supporting the position of the slave central aperture provided at the center position of the slave medium of the first base plate, and a master support member capable of adjusting the first base plate in the x, y directions provided on the outer circumference of the slave support axis, wherein it is desirable that the master support member be a member that is fixed in place after the center position of the pattern formed on the master medium supported therein has been matched with the center position of the slave support axis, and are in a state in which the positions are matched.

It is advantageous that the first base plate be removably provided, and that the first base plate be removed from the transfer position when the position of the master medium is to be matched. At this time, the pattern or the mark of the master medium is visually measured by use of a measuring microscope, and the center position of said pattern is matched to the center position of the slave support axis.

As to the measuring microscope, a microscope provided with a stage that is movable in the x, y directions; wherein, if a plurality of points are plotted while the surface of the subject master medium is observed, a nearly circular area is described and the center position thereof can be obtained, can be used therefor. After the first base plate is placed on the stage and a master medium is loaded and supported in the master support member thereof, the center position of the slave support member is obtained and the center position of the pattern formed on the master medium is obtained from the pattern or from the mark in the same manner, and the position of the master medium is adjusted in the x, y axes of the slave support medium so as to match both of said center positions.

Further, the magnetic transfer apparatus according to the present invention comprises a pressure applying means for pressing a master medium and a slave medium, of which the positions thereof have been matched, together so as to conjoin said master and slave medium to form a conjoined body, and a magnetic field applying means for applying a transfer magnetic field to the conjoined body formed of the position-matched master medium and the slave medium, etc. It is advantageous that the fixing of the position of the master medium supported in the master support member be performed by a suction fixation process or the like.

An electromagnet apparatus or a permanent magnet apparatus can be used as the magnetic field applying means: the magnetic field applying means applies a transfer magnetic field to one or both sides of the contact portion of the master medium and the slave medium; the conjoined body formed by the master and the slave medium or the transfer magnetic field is rotated relative to each other and the magnetic transfer performed.

Further, the magnetic transfer method according to the present invention is a method comprising the steps of: bringing a master medium bearing a data signal and a slave medium formed of a magnetic recording medium for receiving the transfer into close contact to form a conjoined body; and applying a transfer magnetic field thereto, while said conjoined body is being rotated, to perform a magnetic transfer; wherein, it is desirable that the master medium and the slave medium are conjoined by pressure from a pressure applying means, and that said pressure applying means exerts no constraint on the force component in the rotational direction when the conjoined body formed thereby is rotated as an integral unit by the rotational drive of a rotational driving means.

Here, the pressure applying means is a means for moving the slave medium or the master medium in the contact and separation directions to conjoin the master and slave medium, and it is preferable that the each of the slave medium and the master medium are supported on a pressure bearing substrate. Further, the rotation driving means is a means for rotating the conjoined body formed by the conjoined master medium and slave medium as an integral unit, and it is preferable that the rotational force be transferred by the conjoining force of both the master medium and the slave medium, or by a motive force transferring mechanism.

Further, the magnetic transfer apparatus implementing the magnetic transfer method according to the present invention is an apparatus for bringing into close contact the data bearing surface of a disk shaped master medium on which a pattern corresponding to the data to be transferred has been formed with the a recording surface of a slave medium formed of a disk shaped magnetic recording medium for receiving the transfer from said master medium to form a conjoined body, and applying a transfer magnetic field to said conjoined body to perform a magnetic transfer; wherein it is preferable that said apparatus further comprises a rotational base plate for supporting and rotating the master medium or the slave medium, a pressing base plate for pressing against the master medium or the slave medium, a pressure applying base for supporting the pressing base plate and which is capable of moving the pressing base plate in a conjoining-separating direction in relation to the rotational base plate, and a pressure transferring mechanism that does not constrain the force component occurring in the rotational direction between the pressing base plate and the pressure applying base.

It is advantageous that the pushing pressure transferring mechanism is configured of a thrust bearing construction that has been press contacted via a ball bearing or the like, or of an air gap that expels pressurized air. Accordingly, it is preferable that the pressing base plate is rotated with the rotational base plate by the conjoining force or the rotational force transfer mechanism, and that the pressure applying base is fixed in the rotational direction. A mechanism for rotationally driving the rotational axis of the rotational base plate is provided, and the pressing base plate is rotated via the rotational base plate.

At this time, the slave medium or the master medium is positioned in the rotational base plate and supported therein, and the master medium or the slave medium is positioned in the pressing base plate and supported therein; wherein, it is preferable that a positioning means be provided between both the rotational base plate and the pressing base plate, and that the positioning of the master medium and the slave medium be performed thereby.

Further, according to the magnetic transfer apparatus of the present invention, it is preferable that a positioning mechanism, which is provided with a positioning pin or a positioning hole is provided on the rotational base plate or the pressing base plate on which the slave medium is positioned and supported, and provided with a positioning hole or a positioning pin on the rotational base plate or the pressing base plate on which the master medium is positioned and supported, is provided.

Here, the master medium can be provided at a size larger than the slave medium, and a positioning mechanism for matching the position of the rotational base plate or the pressing base plate supporting the slave medium and the position of the master medium can be provided on the portion of the master medium that is not to be brought into contact with the slave medium. Further, a positioning mechanism can be provided for matching the position of the rotational base plate or the pressing base plate supporting the slave medium at the center portion thereof and the position of the master medium. The positioning mechanism comprises a positioning pin on one side and a positioning hole on the other side, wherein it is preferable that the distal end of the positioning pin is tapered. It is preferable that the positioning pin be provided as a plurality of pins along the outer circumference, or as a single pin located at the center position.

As to the magnetic field applying apparatus, although an electromagnet apparatus or a permanent magnet apparatus can be employed therefor, from the standpoint of setting and adjusting the intensity of the magnetic field and other conditions, it is preferable that an electromagnet apparatus be employed. The magnetic field applying apparatus is a means that generates a magnetic field in the direction parallel to the track direction within the range extending in the radial direction of the slave medium, and the magnetic transfer is performed on the entire surface of the slave medium by rotating the conjoined body formed by the master medium and the slave medium brought into and maintained in close contact.

As to the performance of the magnetic transfer, there are cases in which the slave medium is conjoined with the master medium and the transfer is performed successively on one surface of the slave medium at a time, and cases in which a master medium is conjoined to each of both sides of the slave medium and the transfer is performed concurrently on both sides of the slave medium. In the case of the single surface successive transfer, the slave medium (or the master medium) is supported in the rotational base plate, and the master medium (or the slave medium) is supported in the pressing base plate. In the case of the double-sided transfer, a first master medium is supported in the rotational base plate and a second master medium is supported in the pressing base plate, and the slave medium is sandwiched therebetween. In this manner, one side or both sides of the slave medium is brought into close contact with a master medium, and a magnetic field applying apparatus is disposed on one or both sides of the slave medium and the transfer magnetic field is applied.

Note that according to the magnetic transfer method, it is preferable that the slave medium is first subjected to an initial magnetization in the track direction thereof by use of a direct current magnetization process, wherein the slave medium is brought into close contact with the magnetic layer that has been formed over the uneven pattern, which corresponds to the transfer data, of the master medium, and a transfer magnetic field is applied in the direction substantially opposite that in which the initial magnetizing current has been applied to the surface of the slave medium, to perform the magnetic transfer. It is advantageous that the data signal be servo data.

According to the present invention as described above, a master fixing base for fixing the position of the master medium and supporting the master medium in said fixed position, and a conjoining apparatus for bringing the slave medium into close contact with the master medium to form a conjoined body are provided; wherein, by making the master medium exchangeable along with each master medium position fixing base, it becomes unnecessary to position the conjoining apparatus when only the master medium is to be exchanged, whereby the operational efficiency in performing the transfer is improved because the time required to exchange the master medium can be shortened, and the productivity of preformatted slave mediums can thereby be improved.

Further, for cases in which a plurality of master medium position fixing bases are provided, and a conveyor for sequentially moving the master medium position fixing bases to the transfer position is further provided, the time efficiency in transferring the master mediums can be improved a level, and the magnetic transfer operating efficiency can be improved.

Still further, if a cleaning means for removing foreign matter that becomes attached to the surface of the master medium supported in the master medium position fixing base is further provided, cleaning of the master medium is performed directly before the magnetic transfer is performed, the removal of foreign matter that has become attached to the surface of the master medium during the exchange of the master fixing base or the conveyance thereof becomes possible, so that the foreign matter attached to the surface of the master medium when the transfer is to be performed is minimized, whereby transfer deficiencies can be prevented, magnetic transfers exhibiting stable quality characteristics can be performed, and reliability can be improved.

On the other hand, if a cleaning apparatus for washing the master medium together with the master fixing base, in which said master medium is supported, upon the removal of said master fixing base from the conveyor, together with the above-described prevention of transfer deficiencies by the removal of foreign matter form the surface of the master medium, the operational efficiency is further improved because the operation of removing the master medium is not performed when the exchange or cleaning thereof is performed.

Further, according to the present invention: the master medium and the slave medium are brought into close contact and conjoined by the conjoining apparatus; a pressing means applies pressure against the slave medium to press the slave medium against the master medium and a depressurizing means depressurizes the sealed space formed therebetween to obtain a vacuum; wherein, for cases in which the conjoinment pressure of the master medium and the slave medium due to the pushing pressure of the pressing means, and the degree of vacuum due to a depressurizing means are each controlled independently optimal conjoinment conditions can be obtained, complete contact of the master medium and the slave medium can be ensured across the entirety of the respective contact surfaces thereof, the generation of signal omissions caused by contact deficiencies between the master medium and the slave medium can be prevented and favorable transfers free of blemishes and the like can be performed, and even if the degree of vacuum increases, there is no excessive increase in the pushing pressure, whereby a deterioration of the durability of the master medium can be prevented, and the degree of vacuum can be increased so as to prevent air from remaining between the contact surfaces.

In particular, in the state in which air has been expelled from the conjoinment space and the degree of vacuum controlled beforehand, if the master medium and the slave medium are conjoined and the conjoinment pressure controlled, no air remains on either of both of the respective contact surfaces, whereby the contact therebetween can be further improved, leading to an improvement in transfer quality.

Further, if the conjoining apparatus is provided in a configuration comprising a seal element in sliding contact with the surfaces parallel to the contact and separation directions of a lower chamber and an upper chamber that are movable relatively in the conjoining direction thereof, so as to hermetically seal the interior space enclosed by said chambers in the conjoined state, the configuration favorably facilitates the easy independent control of each of the conjoinment pressure and the degree of vacuum.

Still further, even for cases in which the thickness of the elastic member for pressing the slave medium against the master medium, which is provided as required, changes, the form of the upper chamber and the lower chamber of the conjoining apparatus, and the like, does not change, and it is possible to independently control each of the conjoinment pressure and the degree of vacuum occurring when the magnetic transfer is to be performed.

In addition, according to the present invention, for cases in which the pressing surface of the elastic pressing member for pressing against the back surface of the slave medium so as to conjoin said slave medium with the master medium is formed in an uneven form for pressing mainly the contact portion corresponding to the pattern of the master medium, the pressure required for the contact portion can be ensured while reducing the overall pressing force, and a further improvement in contact can be obtained because the pressure on the portion corresponding to the depression portions of the elastic pressing member is low and can serve as a channel through which air can escape; whereby the generation of signal omissions caused by contact deficiencies between the master medium and the slave medium can be prevented, and the quality of the transfer signal as well as the reliability can be improved.

That is to say, for cases in which the transfer data is a servo signal, for example, and the percentage of the entire surface area of the master medium occupied by the surface area of the transfer pattern formed thereon is 10% or less and the pressing surface area of the uneven form on the elastic pressing member, which corresponds to the transfer pattern, is formed on 10% or less of the entire surface the slave medium, the entire pushing force required to achieve a contact force between the master medium and the slave medium of 50 $N/cm^2$ (5.0 $kg/cm^2$) can be reduced to $\frac{1}{10}$ of the 354 N (35.4 kg) required if the entire surface is to be pressed for cases in which the slave medium is a 3.5 inch disk; the thickness, etc., of each load bearing component becomes smaller, and the apparatus can be made more compact. Further, the magnetic poles occurring in the magnetic field applying apparatus can be provided adjacent to the contact surface of the master medium and the slave medium, whereby the intensity of the leakage magnetic field becomes smaller, and a magnetic field having a predetermined magnetic field distribution can be applied to perform a favorable magnetic transfer.

Further, according to the present invention, when the disk shaped slave medium and two disk shaped master medium are brought into close contact so that the slave medium is sandwiched by the master mediums to perform a magnetic transfer, the center positions of both of said two mediums are aligned by the center pin provided on the holder, and for cases in which the eccentricity between the center positions of the master and slave mediums is less than or equal to 100 um, uniform contact can be obtained across the entirety of the respective contact surfaces thereof, damage due to contact on only one side can be prevented, and damage to the edge portions can be prevented, whereby the durability of the medium can be improved.

More particularly, if the eccentricity between the center position of the master medium and the center position of the slave medium is less than or equal to 50 um, a highly accurate transfer can be ensured.

Further, according to the present invention, if the master medium is adjustably disposed on the outer circumference of the slave support axis that determines and secures the position of a central aperture of the slave medium, for cases in which the slave medium is supplied to the slave support axis after the center position of the pattern formed on said master medium has been aligned with the center position of said slave support axis and fixed in said aligned position, and then the positioning of the master medium and the slave medium is performed, the center position of the slave support axis, which serves as the rotational center of the slave medium when the slave medium is loaded into a drive apparatus, can be matched with a high degree of accuracy to the center position of the pattern formed on the master medium, whereby together with an increase in reliability, an improvement in magnetic transfer efficiency is gained as the need to align the position of the slave medium each time that a slave medium is supplied is eliminated.

Further, if pattern formed on the master medium is visually measured by use of a measuring microscope, the center position of said pattern formed on the master medium is matched to the center position of the slave support axis, the position matching can be performed easily and with a high degree of accuracy.

If a positioning mark is provided along with the formation of the transfer pattern on the master medium, the base setting occurring in the position matching of the master medium becomes simple and the operation of adjusting the position by use of the measuring microscope becomes easier.

Further, by providing the magnetic transfer apparatus with a first base plate on the master medium side, a second base plate on the slave medium side, a slave support axis for determining and maintaining the position of the central aperture of the slave medium, and a master support member, which is positionally adjustable in the x, y directions, disposed on the outer circumference of the slave support axis, the above-described operation for accurately matching the respective center positions of the master medium and the slave medium becomes easy, and a highly efficient magnetic transfer can be realized.

If the first base plate is provided so as to be attachable and removable, and is removed from the transfer position when matching the position of the master medium, the position matching operation can be easily performed by use of a measuring microscope or the like.

Further, according to the present invention, when the master medium and the slave medium have been conjoined and the conjoined body formed thereby is rotated and the transfer magnetic field is applied thereto to perform magnetic transfer, for cases in which a configuration has been provided so that the force component, of the pressure between the master medium and the slave medium, occurring in the rotational direction of the conjoined body is not constrained, no misalignment occurs between the rotating side and the pressurized side, and the master medium and the slave medium forming the conjoined body can be rotated as an integral unit, whereby an accurate magnetic transfer can be performed, and as there is no deformation of the apparatus due to repetitive operation, the durability thereof is improved.

Still further, if the substrate that supports the slave medium and determined the position thereof is matched to the master medium by use of a positioning mechanism, the operation for matching the respective center positions of both the master medium and the slave medium can be simplified, and an accurate magnetic transfer can be efficiently performed.

DESCRIPTION OF THE PREFERRED EMBODIMENTS

Figure 1:
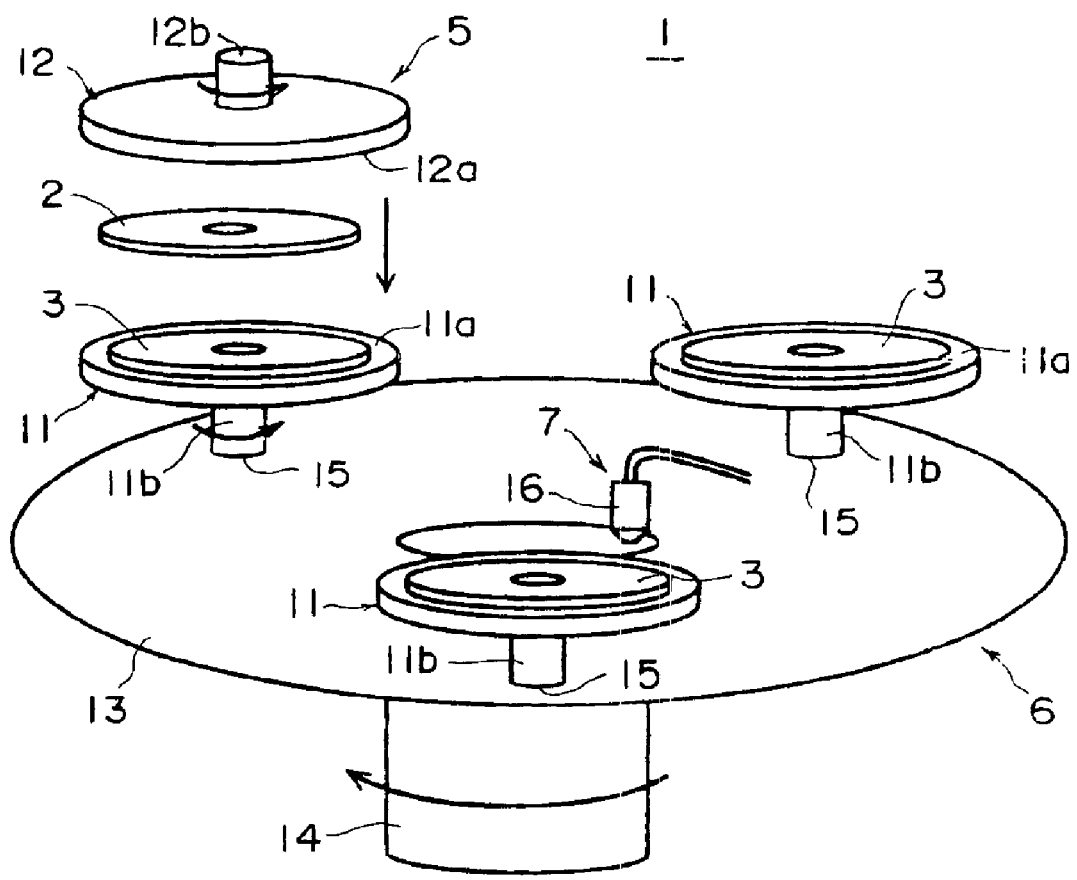
FIG. 1 is a schematic drawing of a magnetic transfer apparatus according to an embodiment of the present invention.

Hereinafter, the preferred embodiments of the present invention will be explained with reference to the attached drawings. FIG. 1 is a schematic drawing of the magnetic transfer apparatus according to an embodiment of the present invention.

The magnetic transfer apparatus 1 shown in FIG. 1 comprises: a lower master fixing base 11 for supporting a master medium 3, which bears a data signal; a conjoining apparatus 5 that is provided with an upper pressing member 12 for pressing the slave medium 2, of which the center position thereof is in the position matched state, having a magnetic recording portion for receiving the transfer from the master medium 3, against said master medium 3 to form a conjoined body; a conveyor 6, which is provided with a plurality of master fixing bases 11, for sequentially moving the plurality of master fixing bases to the transfer position; and a cleaning means 7 for removing foreign matter that becomes adhered to the master medium 3 supported in a master fixing base 11. Further, the magnetic transfer apparatus 1 further comprises a pressing means (not shown) for applying pressure to the conjoining apparatus 5, and a magnetic field applying apparatus (not shown) for applying a magnetic field to the conjoined body while rotating the conjoining apparatus 5.

Each master medium 3 is positioned and maintained in said position within each master fixing base 11, and these master fixing bases 11 are then set in the conveyor 6; when the master medium 3 is to be exchanged, the master fixing base 11 as a whole is exchanged from the conveyor 6.

The conveyor 6 (an index table) is supported on a rotational axis 14 located at the center position of a disk shaped table 13. The table 13 comprises three master fixing base 11 support portions 15, and is moved between a transfer position, an exchange position, and a cleaning position by a rotational drive means (not shown). Note that the number of support portions 15 provided on the conveyor 6 is not limited to being of three locations.

The cleaning means 7 provided at the aforementioned cleaning position comprises an ultrasound washing head 16 for blowing a liquid or a gas, which has been agitated by ultrasonic vibrations, onto the surface of a master medium 3; the cleaning means 7 performs the cleaning operation on the master medium 3 supported in the master fixing base 11 that has been moved to the cleaning position, which directly precedes the transfer position, by the rotation of the conveyor 6, and thereby removes the foreign matter adhering to the surface of said master medium 3. Note that the cleaning means can be a means that blows an ion wind (de-electrified air) or a clean air burst onto the surface of the master medium 3. For cases in which the cleaning is performed as a wet process, an IPA liquid, an IPA steam, or dry air blown onto the surface, etc., can be used to dry said surface of the master medium 3.

The master fixing base 11 is disk shaped, and is provided with an upper surface 11a, which has an outside diameter larger than that of the master medium 3; the lower surface of the master medium 3 is supported by suction or the like on the center portion of this upper surface 11a. In the same manner, the upper pressing member 12 is also disk shaped, and is provided with a lower surface 12a, which is larger than the outside diameter of the slave medium 2; this upper pressing member 12 is movable in the upper and lower directions, i.e., the contact and separation directions with respect to the master fixing base 11, and is provided so as to press the slave medium 2 onto the master medium 3 to form a conjoined body therewith. Note that a sheet-form elastic element can be attached to the lower surface 12a of the upper pressing member 12, and the slave medium 2 can be pressed via this elastic element.

Further, a rotational axis portion 11b and a rotational axis portion 12b are provided protruding from the bottom surface of the master fixing base 11 and the upper surface of the upper pressing member 12, respectively. This master fixing base 11 and upper pressing member 12 are rotated integrally by a rotation mechanism (not shown) during magnetic transfer.

The pressing means (not shown) is provided with a pressure cylinder, and the distal end of the pressure rod thereof applies a predetermined pressure load to the pressing member 12 of the conjoining apparatus 5. Note that because the conjoining apparatus 5 is rotated while in the conjoined state, the pressure is made to act on the rotational axis portion 12b of the pressing member 12.

When the magnetic transfer operation is to be performed, initial direct current magnetization of the slave medium is performed in advance in the planar track direction, in the case of planar recording, or in the perpendicular direction, in the case of perpendicular recording. This slave medium 2, which has been subjected to the initial magnetization, is brought into close contact with the master medium 3 to form a conjoined body, and a transfer magnetic field is applied thereto in the direction opposite that in which the initial direct current magnetization has been applied, or in the perpendicular direction, to perform the magnetic transfer.

A disk shaped magnetic recording medium such as a hard disk, a high density flexible disk, or the like, provided with a magnetic recording portion (a magnetic layer) on one or both faces thereof, is employed as the slave medium 2. The magnetic recording portion thereof is either a magnetic recording layer that has been coated onto the surface thereof, or a magnetic recording layer of thin metallic film formed on the surface thereof.

The master medium 3 is formed as a discoid shape from a hard material. This master medium 3 comprises a pliable magnetic layer that has been formed over a micro uneven pattern formed on the surface of a substrate; this surface becomes the transfer data bearing surface on which the transfer pattern that is to be brought into close contact with the recording surface of the slave medium 2 has been formed. The face of the master medium 3 opposite this transfer data bearing face is supported on the master fixing base 11.

A synthetic resin, a ceramic material, an alloy, aluminum, glass, quartz, silicon, nickel, or the like is used to form the substrate of the master medium. The uneven pattern can be formed by use of a stamping method or the like. The pliable magnetic layer is formed of a magnetic material by use of a vacuum film forming means such as a vacuum deposition method, a sputtering method, an ion platting method, or by a metal plating method, etc. A substantially identical type of master medium is used in both planar recording and perpendicular recording.

In a case, for example, in which planar recording is to be performed, the magnetic field applying apparatus (not shown) for applying a transfer magnetic field or an initial magnetic field comprises a ring shaped electromagnetic head disposed on both the upper and lower sides of the conjoined body, that applies a transfer magnetic field generated parallel to the track direction in the same direction from both the upper and lower sides. The magnetic field applying apparatus can also be provided so as to be rotatable. The magnetic field applying apparatus can be provided on only one side of the conjoined body, or can be a permanent magnet apparatus provided on both sides of the conjoined body. Further, the magnetic field applying apparatus used for cases in which perpendicular recording is to be performed can comprise electromagnets or permanent magnets of different polarities disposed in the upper and lower sides of the conjoining apparatus 5, respectively, wherein the transfer magnetic field is generated in the perpendicular direction and applied. If the magnetic field is applied partially to only a portion of the surface, either the conjoining apparatus 5 or the magnetic field is rotated to perform the magnetic transfer across the entirety of the surface.

Figure 2:
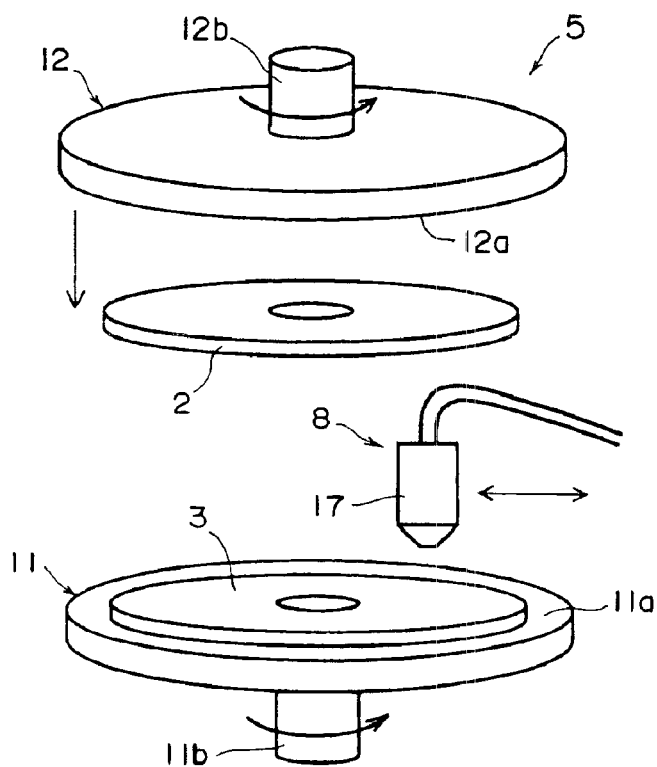
FIG. 2 is a schematic drawing of the conjoining apparatus portion occurring in another embodiment of the present invention.

As shown in FIG. 2, the magnetic transfer apparatus 1 can be provided with a cleaning means 8 at the transfer position thereof, that is, as a portion of the conjoining apparatus 5, for subjecting the master medium 3 to a cleaning process directly preceding the performance of the magnetic transfer. Further, the master medium 3 can be cleaned directly after loading thereof at the transfer position.

The cleaning means 8 shown in FIG. 2 comprises an ultrasound washing head 17 disposed in the vicinity of the transfer position and so as to be movable toward and away from the conjoining apparatus 5. The ultrasound washing head 17, in the same manner as described above, is a washing head that blows a liquid or a gas that has been agitated by ultrasonic vibrations, or a washing head that blows an ion wind (de-electrified air) or clean air onto the surface that is to be cleaned. Then, the ultrasound washing head 17 is moved over the master medium 3 which is supported in the master fixing base 11 and performs the cleaning operation thereon, while the upper pressing member 12 is in the open state, after which it is withdrawn to the standby position.

Further, the slave medium 2 can be cleaned directly preceding the conjoinment thereof with the master medium 3. The cleaning of the slave medium 2 can be performed by the same cleaning means 8 used for cleaning the master medium 3, or by a different cleaning means.

The magnetic transfer apparatus 1 is an apparatus for performing a magnetic transfer from the same master medium 3 to a plurality of slave mediums 2; wherein first, a master medium 3 is positioned and supported in each of a plurality of master fixing bases 11, and this plurality of master fixing bases 11 is set into a conveyor 6. Then, before being moved to the transfer position, the master medium 3 supported in the master fixing base 11 is cleaned by the cleaning means 7. After said master medium 3 has been cleaned by the cleaning means 8, the master fixing base 11 in which said master medium 3 is supported is moved to the transfer position by the rotation of the conveyor 6, and after the center position of a slave medium 2, which has been initially magnetized in the planar direction or in the perpendicular direction, is aligned while the pressing member 12 is in the open state wherein there is a gap separating said pressing member 12 and the master fixing base 11, the pressing member 12 of the conjoining means 5 is moved toward the master fixing base 11 and the master medium 3 and the slave medium 2 are conjoined under a predetermined pressure by the pressure applying means. The cleaning means 8 shown in FIG. 2, if provided, cleans the master medium 3 (and the slave medium 2) immediately preceding said conjoinment of said master medium 3 and slave medium 2.

Then, the magnetic field applying means is made to approach the upper and lower sides of the conjoining means 5, and a transfer magnetic field is applied, while the conjoined body is rotated, in the direction substantially opposite that in which the initial magnetic field was applied, to transfer and record the magnetic pattern corresponding to the transfer pattern formed on the master medium 3 to the magnetic recording portion of the slave medium 2.

The transfer magnetic field applied when the magnetic transfer is performed is absorbed by the pattern of the protrusion portions formed by the pliable magnetic body of the transfer pattern on the master medium 3 conjoined with slave medium 2, and as a result: in the case of planar recording, the initial magnetization of this portion is not inverted, whereas the initial magnetization of the other portions is inverted; in the case of perpendicular recording, the initial magnetization of this portion is inverted, whereas the initial magnetization of the other portions is not inverted, and the magnetic data corresponding to the transfer pattern formed on the master medium 3 is transferred and recorded on the slave medium 2.

Then, when magnetic transfer has been performed a predetermined number of times, and an irregularity such as foreign matter becoming adhered to the surface of the master medium 3 or slave medium 2, or transfer deficiencies or the like occurs, the conveyor is rotated and a new master fixing base 11, having just been cleaned, is moved to the transfer position, and then the next magnetic transfer is performed in continuation in the same manner as described above.

The master fixing base 11 that has been moved from the transfer position to the standby position is removed according to its state from the conveyor 6 and exchanged. When the exchange is performed, the master fixing base 11 as a whole is removed from the conveyor 6, and a master fixing base 11 supporting a new master medium 3 is set therein. Further, for cases in which a master medium 3 can be reused after being cleaned by the cleaning means 7, the exchange is not performed.

Further, as to master fixing bases 11 that have been removed from the conveyor 6, the master mediums 3 supported in each of said removed master fixing bases 11 can be cleaned by use of a separately provided cleaning apparatus. This cleaning apparatus may be provided instead of the cleaning means 7, or they can be provided so that both perform cleaning.

The master mediums 3 can be cleaned by this cleaning means by, for example, being submersed into the wash liquid contained within a wash tub while still being supported in their respective master fixing bases 11, and agitating said wash liquid with ultrasound vibrations from an ultrasound head, whereby the foreign matter adhered to the surface of the master medium 3 removed. Alternatively, a liquid washing by a liquid that has been bombarded by megasonic vibrations from an ultrasound washing head, an atmospheric washing by ultrasound vibrations from an ultrasound head, a glide cleaning employing a glide head, an ultrasound wash performed after a glide cleaning is carried out, an incinerating wash by the light emitted from an excimer laser, a plasma cleaning, or the like can be employed.

Note that the slave medium 2 can be supported in a holder (not shown) and the slave medium 2 can be cleaned together with said holder in the process preceding the magnetic transfer.

According to the current embodiment: the conveyor 6 is provided with a plurality of master fixing bases 11, each of which determines and maintains the position of a master medium 3 supported therein; the master medium is sequentially cleaned by a cleaning means 7 and a cleaning means 8, and moved to the transfer position, in which the magnetic transfer is then performed; wherein, because the master medium 3 is exchanged along with the magnetic transfer master fixing base 11, exchanging the master mediums 3 is easy, and the operational efficiency thereof is high, whereby an improvement in production efficiency is obtained, and the occurrence of transfer deficiencies can be prevented by the cleaning of the master medium immediately prior to the performance of the magnetic transfer, enabling the performance of a high quality magnetic transfer. Further, even for cases in which the master medium 3 is washed together with the master fixing medium removed from the conveyor 6, the operational efficiency can be improved because the master medium is not removed from the master fixing base 11 when the exchange and cleaning thereof is performed.

Figure 3:
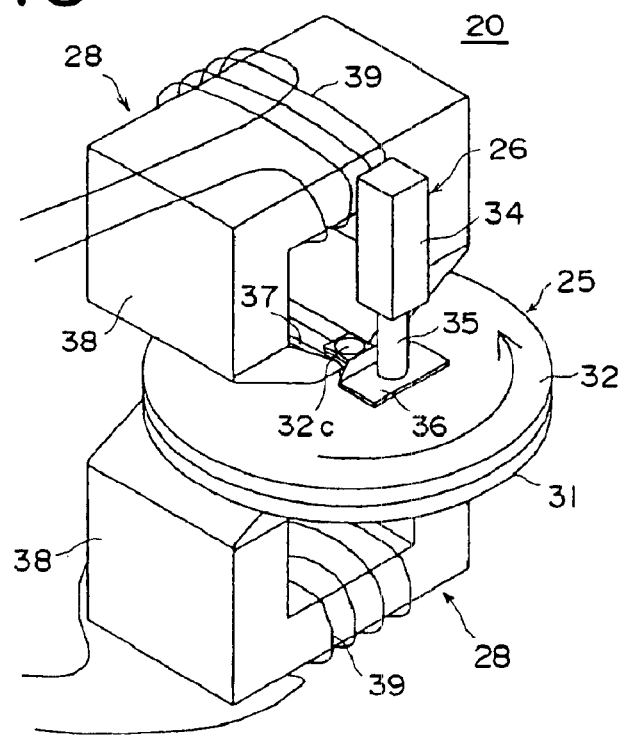
FIG. 3 is a perspective view of the main portion of the transfer state of a magnetic transfer apparatus according to another embodiment of the present invention.
Figure 4:
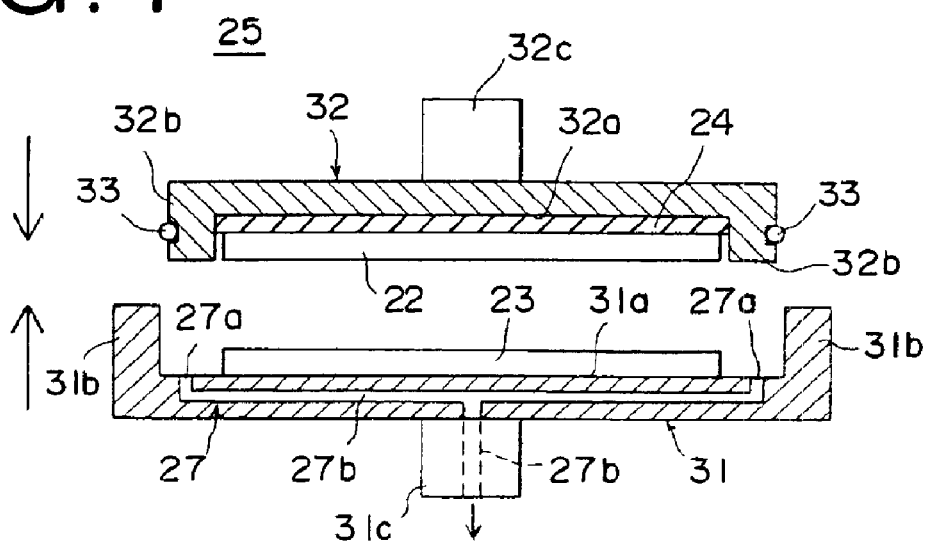
FIG. 4 is a cross-sectional view of a conjoining apparatus.

Next, another embodiment according to the present invention will be explained. FIG. 3 is a perspective view of the main part of a magnetic transfer apparatus in the transfer state according to the current embodiment. FIG. 4 is cross-sectional view of the conjoining apparatus according to the current embodiment. Note that each drawing is a model drawing, and the actual dimensions of each of the portions shown therein are of a different ratio.

The magnetic transfer apparatus 20 shown in FIG. 3 comprises: a lower-side chamber 31 and an upper-side chamber 32; a conjoining apparatus 25 provided with an elastic element 24 disposed on the inner portion thereof, as shown in FIG. 4, for conjoining a slave medium 23 and a master medium 23 of which the center positions thereof are in the position matched state; a pressing means 26 for applying pressure to the conjoining means 25; a decompressing means 27 (refer to FIG. 4) for removing air from the interior of the conjoining means 25 and decompressing the inner portion thereof; and a magnetic field applying apparatus 28 for applying a magnetic field while rotating the conjoining apparatus 25. The degree of vacuum, which is provided by the decompressing means 26, within the conjoining apparatus 25, and the pressure on the slave medium 22 and the master medium 23, which is provided by the pressing means 26, are each controlled independently.

The lower chamber 31 of the conjoining means 25 is disk shaped, and has a disk shaped upper surface 31a that is larger than the outer diameter of the master medium 23; the lower surface of the master medium 23 is supported on the center portion of this upper surface 31a by suction or the like. The upper chamber 32 is disk shaped, and has a disk shaped lower surface 32a that is larger than the outer diameter of the slave medium 22; a sheet shaped elastic element 24 is attached to this lower surface 32a, and the slave medium 22 is supported on the lower surface of this sheet shaped elastic element 24. The upper chamber 32 is movable in the vertical direction so as to be separated and brought into contact with the lower chamber 31, and is provided so as to press the slave medium 22 onto the master medium 23 to form a conjoined body. Note that the slave medium 22 can also be set above the master medium 23.

An upwardly protruding flange portion 31b is provided on the outer circumference of the lower chamber 31, and a downwardly protruding flange portion 32b is provided on the outer circumference of the upper chamber 32. The diameter of the outer circumferential surface of the flange portion 32b of the upper chamber 32 is smaller than the diameter of the inner circumferential surface of the flange portion 31b of the lower chamber 31, and the flange portion 32b of the upper chamber 32 is provided so as to be insertable into the inner circumference side of the flange portion 31b of the lower chamber 31 (the size relation between the respective flange portions can be reversed) Further, a seal element 33, which is an O-ring, is installed around the outer circumference of the flange portion 32b of the upper chamber 32, and when the upper chamber 32 is moved toward the lower chamber 31, this seal element 33 slidably contacts the inner circumference surface of the flange portion 31b of the lower chamber 31, serving to seal off the surfaces in the direction substantially parallel to that of the contact and separation directions (the axial direction), thereby hermetically sealing the space within the interior of both the lower chamber 31 an the upper chamber 32. The seal element 33 can also be installed o the lower chamber 31.

The upper chamber 32 and the lower chamber 31 are provided so as to be movable in the aforementioned axial direction when in the state wherein the interior portion of said upper chamber 32 and lower portion 31 is hermetically sealed by the seal element 33. Further, the hermetically sealed state is ensured even if the height of the conjoined body formed by the master medium 23 and the slave medium 22 changes due to a change in the thickness of the elastic element 24.

Rotational axes 31c and 32c are provided protruding from the bottom surface of the lower chamber 31 and the top surface of the upper chamber 32. This lower chamber 31 and upper chamber 32 are connected to a rotational mechanism and rotated thereby as an integral unit.

Further, an air expelling outlet 27a of the decompressing means 27 is opened at a position more inward than the flange portion 31b in the radial direction, and more outer than the master medium 23 in the radial direction, in the upper surface 31a. An air channel 27b connected to this air expelling outlet 27a is formed within the lower chamber 31, and leads to the exterior through the rotational axis portion 31c, where it connects to a vacuum pump (not shown). By the expulsion of air by this decompressing means 27, the hermetically sealed space formed by the upper chamber 32 and the lower chamber 31 can be controlled to a predetermined degree of vacuum of 50–100 Pa.

As shown in FIG. 3, the pressing means 26 is provided with a pressurizing cylinder 34, and the distal end of the push rod 35 thereof applies a predetermined pressure load to the upper chamber 32 of the conjoining apparatus 25. Note that because the conjoining apparatus 25 is rotated while in the state in which pressure is being applied thereto, the rotational axis portion 32c of the upper chamber portion 32 is provided with a receiving member 36 so as to facilitate the operational effect of the applied pressure. The control of the degree of vacuum pressure is made independent and is controlled to the optimal value so that the pressure from this pressure applying means 26 produces a resulting conjoinment pressure between the master medium 23 and the salve medium 22 of 0.01–49N/cm$^2$ (1–5000 gf/cm$^2$).

When a magnetic transfer is to be performed, an initial magnetization of the slave medium 22 is performed to magnetize the slave medium 22 in the planar track direction for cases in which planar recording is to be performed, and in the perpendicular direction for cases in which a perpendicular recording is to be performed. This slave medium 22 is then conjoined with the master medium 23, and a transfer magnetic field is applied in the direction substantially the opposite of that in which the initial magnetization has been performed, or in the perpendicular direction to perform the magnetic transfer.

A disk shaped recording medium such as a hard disk or a flexible disk having a magnetic recording portion (a magnetic layer) formed on one or both surfaces thereof is employed as the slave medium 22. The magnetic recording portion consists of a magnetic recording layer that has been coated onto the surface thereof, or a magnetic recording layer of thin metallic film formed on the surface thereof.

A disk shaped medium formed of a hard material is employed as the master medium 23. This master medium 23 comprises a pliable magnetic layer that has been coated over a micro uneven pattern formed on the surface of a substrate; this surface becomes the transfer data bearing surface on which the transfer pattern that is to be brought into close contact with the recording surface of the slave medium 22 has been formed. The face of the master medium 23 opposite this transfer data bearing face is the surface which is supported by vacuum adsorption on the lower chamber 31.

A synthetic resin, a ceramic material, an alloy, aluminum, glass, quartz, silicon, nickel, or the like is used to form the substrate of the master medium 23. The uneven pattern can be formed by use of a stamping method or the like. The pliable magnetic layer is formed of a magnetic material by use of a vacuum layer forming means such as a vacuum deposition method, a sputtering method, an ion plating method, or by a metal plating method, etc. A substantially identical type of master medium is used in both planar recording and perpendicular recording.

The elastic element 24 is formed of an elastic material in a disk shape, is supported on the upper chamber 32, and connects to and presses against the back surface (upper surface) of the slave medium 22. As to the elastic material used to form the elastic element 24, a silicon rubber, a polyurethane rubber, a fluorine rubber, 1,3-butadiene rubber, Teflon (registered trademark) rubber, viton rubber or other common rubber, or a foam resin such as sponge rubber or the like can be used therefor.

For cases in which planar recording is to be performed, the magnetic field applying apparatus 28 for applying an initial magnetic field and a transfer magnetic field comprises, for example, a ring shaped electromagnetic head disposed on both the upper and lower sides of the conjoined body provided with a core 38, which has a gap 37 extending in the radial direction of the slave medium 22, around which a coil 39 has been wound, and applies a transfer magnetic field, which is generated in the direction parallel to the track direction, in the same direction from both the upper and lower sides of the conjoined body. The conjoining apparatus 25 is rotated and the transfer magnetic field is applied across the entire surface of the slave medium 22 and the master medium 23. The magnetic field applying means 28 can also be provided so as to be rotatable. The magnetic field applying means 28 can also be disposed on only one side of the conjoining apparatus 25, or can be a permanent magnet apparatus disposed on one or both sides of the conjoining apparatus 25.

Further, for cases in which a perpendicular recording is to be performed, the magnetic field applying apparatus 28 comprises electromagnets or permanent magnets of different polarities disposed in the upper and lower sides of the conjoining apparatus 25, respectively, wherein the transfer magnetic field is generated in the perpendicular direction and applied. If the magnetic field applying apparatus 28 is of the type that applies a magnetic field to only a portion of the surface, the conjoining apparatus 5 or the magnetic field is moved to perform the magnetic transfer across the entirety of the surface.

The magnetic transfer apparatus 20 is an apparatus for performing a magnetic transfer from the same master medium 23 to a plurality of slave mediums 22: first, the positions of the master medium 23 and the elastic element 24 are matched and supported in the lower chamber 31 and the upper chamber 32, respectively; then, while the upper chamber 32 and the lower chamber 31 are in the open state, that is, the state in which there is a separation therebetween, a slave medium 22, which has been subjected to an initial magnetization in the planar direction or in the perpendicular direction in advance, is positioned wherein the center position hereof is matched and set; after which the pressing means 26 is driven and the upper chamber 32 is moved toward the lower chamber 31.

Then, the seal 33 of the upper chamber 32 slidably contacts the inner circumference surface of the flange portion 31b of the flange portion 31, whereby the space in the interior between the chambers 31 and 32 holding the master medium 23 and the slave medium 22 is hermetically sealed. Before the slave medium 22 and the master medium 23 are in the pressurized state, the decompressing means 27 expels air from the hermetically sealed space so as to depressurize said space, and after a predetermined degree of vacuum has been obtained in the interior of said hermetically sealed space, the upper chamber is further lowered towards the lower chamber. Pressure is applied by the pressing means 26, the back surface of the slave medium 22 is pressed against by the elastic element 24, and the slave medium 22 and the master medium 23 are conjoined under a predetermined conjoining pressure.

Then, the upper and lower magnetic field applying apparatuses 28 are made to approach the upper and lower faces of the conjoining means 25, and a transfer magnetic field is applied, while the conjoining apparatus 25 is being rotated, in the direction substantially the opposite of that in which the initial magnetization was applied, whereby the magnetic pattern corresponding to the transfer pattern of the master medium 23 is transferred and recorded on the magnetic recording portion of the slave medium 22.

The transfer magnetic field applied when the magnetic transfer is performed is absorbed by the pattern of the protrusion portions formed by the pliable magnetic body of the transfer pattern on master medium 3 conjoined with slave medium 22, and as a result: in the case of planar recording, the initial magnetization of this portion is not inverted, whereas the initial magnetization of the other portions is inverted; in the case of perpendicular recording, the initial magnetization of this portion is inverted, whereas the initial magnetization of the other portions is not inverted, and the magnetic data corresponding to the transfer pattern formed on the master medium 23 is transferred and recorded on the slave medium 22.

According to the current embodiment: because the lower chamber 31 and the upper chamber 32 are first brought together and the interior portion therebetween hermetically sealed, and the interior portion thereof is then decompressed to a predetermined degree of vacuum and the remaining air expelled therefrom while in the hermetically sealed state, after which a predetermined pressure is applied independently so as to conjoin the master medium 23 and the slave medium 22, the conjoinment of the master and slave mediums can be improved by conjoining said master and slave medium at an optimal degree of vacuum and pressure, whereby the transfer deficiencies accompanying contact deficiencies can be prevented and a favorable magnetic transfer can be performed.

Figure 5:
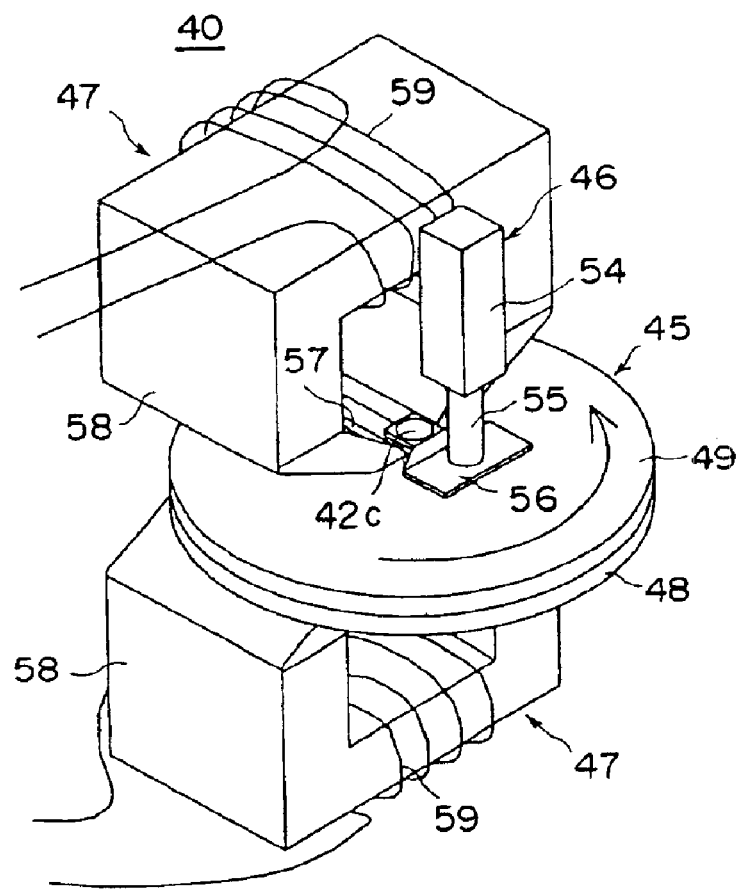
FIG. 5 is a perspective view of the main portion of the transfer state of a magnetic transfer apparatus according to yet another embodiment of the present invention.
Figure 6:
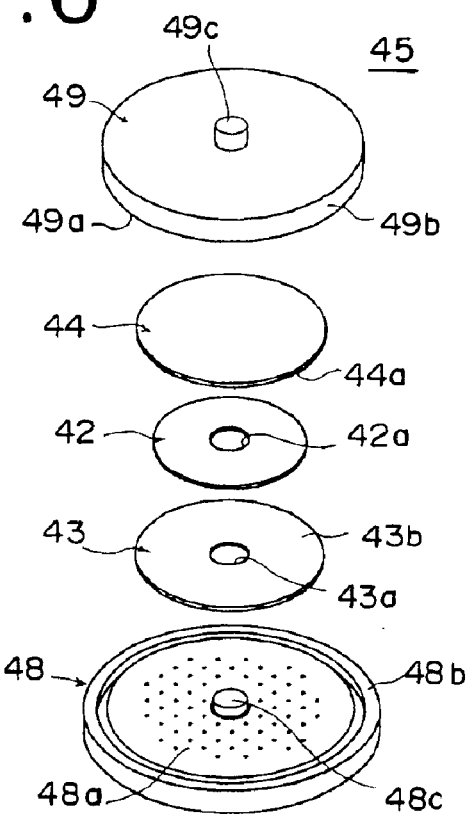
FIG. 6 is an exploded view of a conjoining apparatus.

Next, yet another embodiment according of the present invention will be explained. FIG. 5 is a perspective view of the main portion of a magnetic transfer apparatus in the transfer state according to an embodiment of the present invention. FIG. 6 is an exploded perspective view of a conjoining apparatus, and FIG. 7 is a plan view of an elastic pressing member and a master medium according an embodiment of the present invention. Note that each of said drawings is a model drawing; the thickness and other actual dimensions of the portions shown therein are of a different ratio.

The magnetic transfer apparatus 40 shown in FIG. 5 comprises: a lower pressure contact member 48 and an upper pressure contact member 49; wherein a master medium 43 and a slave medium 42 and an elastic pressing member 44 are disposed in the interior portions of the lower pressure contact member 48 and the upper pressure contact member 49 as shown in FIG. 6; a conjoining means 45 provided for matching the center positions thereof and conjoining said master medium 49 and slave medium 48; a pressure applying apparatus 46 for applying pressure to the conjoining apparatus 45; and a magnetic field applying apparatus 47 for applying a transfer magnetic field while rotating the conjoining apparatus 45.

When a magnetic transfer is to be performed, an initial magnetization of the slave medium 42 is performed in advance by applying an initial direct current to magnetize the slave medium 42 in the planar track direction for cases in which planar recording is to be performed, and in the perpendicular direction for cases in which a perpendicular recording is to be performed. This slave medium 42 is then conjoined with the master medium 43, and a transfer magnetic field is applied in the direction substantially the opposite of that in which the initial direct current magnetization has been performed, or in the perpendicular direction to perform the magnetic transfer.

A disk shaped recording medium such as a hard disk or a flexible disk having a magnetic recording portion (a magnetic layer) formed on one or both surfaces thereof, and on which a central aperture 42a has been opened is employed as the slave medium 42. The magnetic recording portion consists of a magnetic recording layer that has been coated onto the surface thereof, or a magnetic recording layer of thin metallic film formed on the surface thereof.

A disk shaped medium formed of a hard material on which a central aperture 43a has been opened is employed as the master medium 43. This master medium 43 comprises a pliable magnetic layer that covers a micro uneven pattern formed on the surface of a substrate; this surface is the transfer data bearing surface 43b on which the transfer pattern that is to be brought into close contact with the recording surface of the slave medium 42 has been formed. The face of the master medium 43 opposite this transfer data bearing face is the surface which is supported by vacuum adsorption on the lower pressure member 48.

A synthetic resin, a ceramic material, an alloy, aluminum, glass, quartz, silicon, nickel, or the like is used to form the substrate of the master medium 43. The uneven pattern can be formed by use of a stamping method or the like. This pliable magnetic layer is formed of a magnetic material by use of a vacuum layer forming means such as a vacuum deposition method, a sputtering method, an ion plating method, or by a metal plating method, etc. A substantially identical type of master medium 43 is used in both planar recording and perpendicular recording.

Figure 7A:
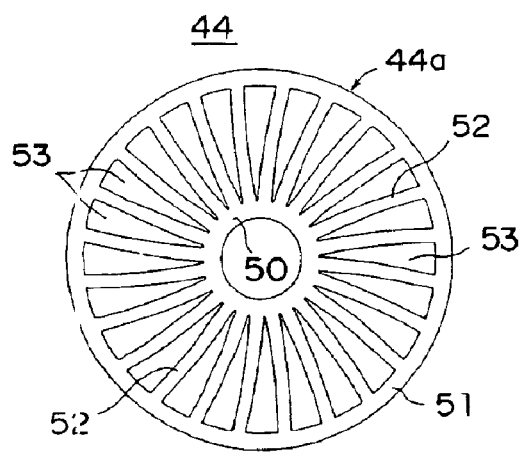
FIGS. 7A and 7B are plan views of an elastic pressing member and a master medium, respectively, according to still yet another embodiment according to the present invention.
Figure 7B:
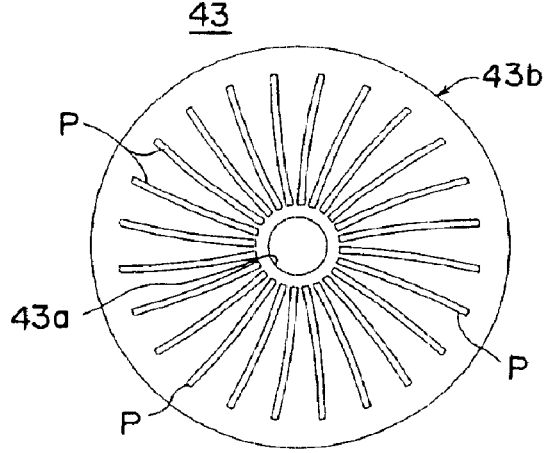

For the case in which the transfer data is a servo signal, a servo pattern P (a transfer pattern) is formed in narrow regions extending from the center at equal intervals in a substantially radial pattern (slightly curved in the drawing), as shown in FIG. 7B. The portions of this servo pattern P are the portions that are required to be brought into contact with the slave medium 42, and the magnetic pattern corresponding to the servo pattern P is transferred and recorded onto the slave medium 42 by the magnetic transfer.

The elastic pressing member 44 is formed of an elastic material in a disk shape, is supported on the upper pressure contact member 49, and connects to and presses against the back surface (upper surface) of the slave medium 42. The form of the pressing surface 44a of the elastic pressing member 44 that is to be brought into contact with the back surface of the slave medium 42, as shown in FIG. 7A, is provided with depression and protrusion portions for pressing mainly against the portions that correspond to the servo pattern P of the master medium 43.

The pressing surface 44a comprises an inner ring portion 50 on the inner circumference thereof, an outer ring portion 51 on the outer circumference thereof, and a plurality of radial portions 42 corresponding to the servo pattern P of the master medium 43 joining the inner ring portion 50 and the outer ring portion 51, which is formed as the pressing protrusion portion that contacts the slave medium 42. The other portions thereof are formed as depression portions 53 (which can be devoid of substance and open clear through to the back surface), and do not come into contact with the slave medium 42.

The elastic material used to form the elastic pressing member 44 must exhibit a degree of elasticity wherein the pressing surface area does not increase excessively when pressure is applied. More specifically, a silicon rubber, a polyurethane rubber, a fluorine rubber, 1,3-butadiene rubber, Teflon (registered trademark) rubber, viton rubber or other common rubbers, or a foam resin such as sponge rubber or the like can be used therefor.

The lower pressure contact member 48 of the conjoining apparatus 45 is provided with a circular adsorption surface 48a corresponding to the size of the master medium 43; the surface thereof has been finished to be flat. This adsorption surface 48a is a surface on which a substantially uniformly dispersed plurality of suction pores have been opened (a porous surface can also be used). Although not shown in the drawing, these suction pores are connected by a suction channel leading from the interior to the exterior of the lower pressure contact member 48 to a vacuum suction pump that provides the suction force; the bottom surface of the master medium 43 brought into close contact with the adsorption surface 48a is vacuum adsorbed, and the flatness of said master medium 43 is favorably corrected along the surface of the adsorption surface 48a. The upper pressure contact member 49 is provided with a support surface 49a for holding the elastic pressing member 44.

The outer form of the lower pressure contact member 48 and the upper pressure contact member 49 is disk shaped, and the upper pressure contact member 49 is movable in the axial direction; wherein, the upper pressure contact member 49 is moved in the separation or contact direction by the pressure applying apparatus 46, and the lower pressure contact means 48 and the upper pressure contact means 49 are brought into pressurized contact at a predetermined pressure. The lower pressure contact member 48 and the upper pressure contact member 49 are provided with a flange portion 48b and a flange portion 49b on the respective outer circumferences thereof, and when the closing operation is to be performed, the flange portion 48b and a flange portion 49b of the lower pressure contact member 48 and the upper pressure contact member 49 abut each other, whereby the interior portion thereof is maintained in a hermetically sealed state. A pin 48c for coupling with the central apertures 43a and 42a of the master medium 43 and the slave medium 42 and determining the positions thereof, respectively, is provided at the center portion of the lower pressure contact member 48. The position of the radial portions 52 of the elastic pressing member 44 is matched to the position of the servo pattern P of the master medium 43 and supported in the matched position state by use of a positioning mechanism (not shown) that is provided on the support surface 49a of the upper pressure member 49. Further, the lower pressure member 48 and the upper pressure member 49 are connected to a rotational mechanism (not shown) and rotated thereby as an integral unit.

As shown in FIG. 5, the pressure applying means 46 is provided with a pressurizing cylinder 54, and the distal end of the push rod 55 thereof applies a predetermined pushing pressure load to the upper pressure member 49 of the conjoining apparatus 45. The pushing force is set, based on the contact surface area, so that the pushing force from this pressure applying means 46 results in a conjoinment pressure between the master medium 43 and the salve medium 42 in the vicinity of the servo pattern P is of the optimal value of 0.01–50 N/cm$^2$ (1–5.0 kg/cm$^2$). Note that because the conjoining apparatus 45 is rotated while in the pressurized state, the center axis portion 49c of the upper chamber pressure member 49 is provided with a receiving member 56 so as to facilitate the operational effect of the applied pressure.

For cases in which planar recording is to be performed, the magnetic field applying apparatus 47 for applying an initial magnetization magnetic field and a transfer magnetic field comprises, for example, a ring shaped electromagnetic head disposed on both the upper and lower sides of the conjoined body and which is provided with a core 58, which has a gap 57 extending in the radial direction of the slave medium 42, around which a coil 59 has been wound, and applies a transfer magnetic field, which is generated in the direction parallel to the track direction, in the same direction from both the upper and lower sides of the conjoined body. The conjoining apparatus 45 is rotated and the transfer magnetic field is applied across the entire surface of the slave medium 42 and the master medium 43. The magnetic field applying means 47 can also be provided so as to be rotatable. The magnetic field applying means 47 can also be disposed on only one side of the conjoining apparatus 45, or can be a permanent magnet apparatus disposed on one or both sides of the conjoining apparatus 45.

Further, for cases in which perpendicular recording is to be performed, the magnetic field applying apparatus 47 comprises electromagnets or permanent magnets of different polarities disposed in the upper and lower sides of the conjoining apparatus 45, respectively, wherein the transfer magnetic field is generated in the perpendicular direction and applied. If the magnetic field applying apparatus 47 is of the type that applies a magnetic field to only a portion of the surface, the conjoining apparatus 45 or the magnetic field is moved to perform the magnetic transfer across the entirety of the surface.

The magnetic transfer apparatus 40 is an apparatus for performing a magnetic transfer from the same master medium 43 to a plurality of slave mediums 42: first, the center position of each of the master medium 43 and the elastic pressing member 44 are matched to the that of the lower pressure contact member 48 and the upper pressure contact member 49, respectively, then the pattern positions of each of the master medium 43 and the elastic pressing member 44 are matched, and the master medium 43 and the elastic pressing member 44 are held by the lower pressure contact member 48 and the upper pressure contact member 49, respectively; then, while the lower pressure contact member 48 and the upper pressure contact member 49 are in the open state, that is, the state in which there is a separation therebetween, a slave medium 42, which has been subjected to an initial magnetization in one of either the planar direction or the perpendicular direction in advance, is positioned wherein the center position thereof is matched and set; after which the pressing means 46 is driven and the upper pressure member 49 is moved toward the lower pressure member 48 to perform the closing operation; the elastic pressing member 44 is brought into contact with the back face of the slave medium 42, wherein the protrusion portion of the pushing surface 44a thereof presses the slave medium mainly against the proximity of the servo pattern P to conjoin the master medium 43 and the slave medium 42. Then, the upper and lower magnetic field applying apparatuses 47 are made to approach with the upper and lower faces of the conjoining means 45, and a transfer magnetic field is applied, while the conjoining apparatus 45 is being rotated, in the direction substantially the opposite of that in which the initial magnetization current was applied, whereby the magnetic pattern corresponding to the transfer pattern of the master medium 43 is transferred and recorded on the magnetic recording portion of the slave medium 42.

The transfer magnetic field applied when the magnetic transfer is performed is absorbed by the pattern of the protrusion portions formed by the pliable magnetic body of the transfer pattern on the master medium 43 and conjoined with the slave medium 42, and as a result: in the case of planar recording, the initial magnetization of this portion is not inverted, whereas the initial magnetization of the other portions is inverted; in the case of perpendicular recording, the initial magnetization of this portion is inverted, whereas the initial magnetization of the other portions is not inverted, and the magnetic data corresponding to the transfer pattern formed on the master medium 43 is transferred and recorded on the slave medium 42.

According to the current embodiment: because the elastic pressing member 44 provided with the pushing surface 44a, which is formed of the depression portion and the protrusion portion, presses against the back surface of the slave medium 42 at mainly the transfer pattern portion of the master medium 43 when the master medium 43 and the slave medium 42 are to be conjoined, the contact at the pattern portion required for the conjoinment is improved, whereby the transfer deficiencies accompanying contact deficiencies can be prevented and a favorable magnetic transfer can be performed, and the overall pushing pressure can be lowered, enabling the apparatus to be made more compact.

Figure 8:
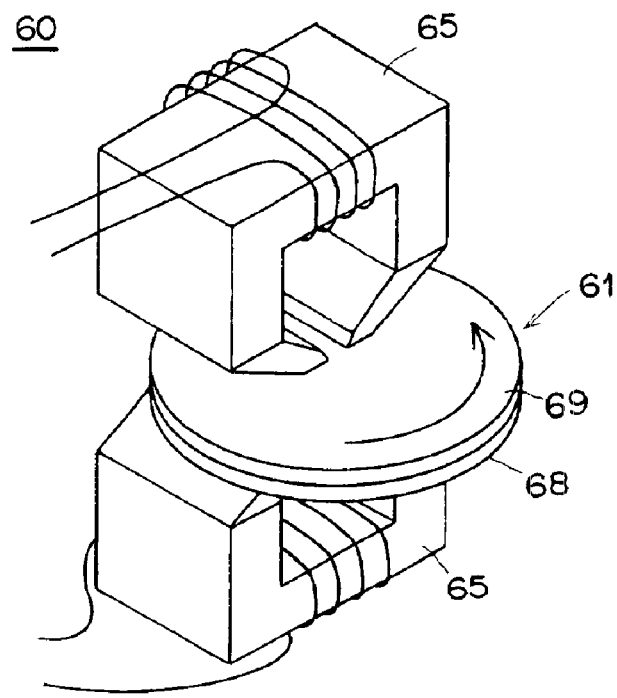
FIG. 8 is a perspective view of the main portion of the transfer state of a magnetic transfer apparatus according to yet another embodiment of the present invention.
Figure 9:
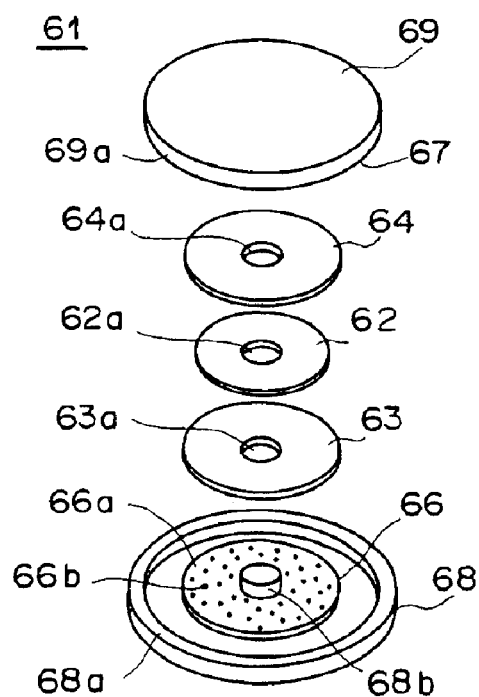
FIG. 9 is an exploded view of the holder shown in FIG. 8.

Next, still yet another embodiment according of the present invention will be explained. FIG. 8 is a perspective view of the main portion of a magnetic transfer apparatus in the transfer state according to an embodiment of the present invention. FIG. 9 is an exploded perspective view of a holder.

The magnetic transfer apparatus 60 shown in FIGS. 8 and 9 is an apparatus for performing a planar recording type magnetic transfer on both recording surfaces of a slave medium 62 concurrently: disk shaped master mediums 63 and 64 are conjoined to the upper and lower surfaces of a slave medium 62 within a holder 61; said holder 61 is rotated and while said holder 61 is rotating a transfer magnetic field is applied thereto by a magnetic field applying apparatus 65 (an electromagnetic apparatus) disposed on the upper and lower sides of said holder 61 to concurrently magnetically transfer and record the data borne on the master mediums 63 and 64 to both recording surfaces of the slave medium 62.

The holder 61 comprises a lower holder 68 and upper holder 69 both having cylindrical structures; wherein a lower master medium 63 for transferring data such as a servo signal or the like to the lower side recording surface of the slave medium 62, and an upper master medium 64 for transferring data such as a servo signal or the like to the upper side recording surface of the slave medium 62 are exchangeably housed therein. The lower holder 68 is provided with a lower adsorption member 66 for adsorbing the lower master medium 63 and correcting the flatness thereof, and the upper holder 69 is provided with an upper adsorption member 67 (of the same configuration as the lower suction member 66) for adsorbing the upper master medium 64 and correcting the flatness thereof. The center positions of the respective upper master medium 64 and the lower master medium 63 are matched with the center position of the slave medium 62, pressure contacted to both sides of said slave medium 2 while maintained in the position-matched state, and opposingly conjoined with the upper and lower surfaces of said slave medium 62, respectively. Here, "opposingly conjoined" refers to either the conjoined state in which the surfaces of the master mediums 63, 64 and the slave medium 62 are in contact, or the state in which said surfaces are facing one another while a small gap exists therebetween.

One or both of the lower holder 68 and the upper holder 69 are provided so as to be movable in the axial direction thereof, and are opened and closed by the operation of an opening and closing mechanism (not shown). Further, the holder 61 is provided with a vacuum suction means (not shown) for vacuum suctioning the air contained within the interior space formed by the slidable contact of the lower holder 68 and the upper holder 69, whereby a depressurized state is produced in the interior portion thereof, and contact force is obtained between the slave medium 62 and the upper and lower master mediums 63 and 64.

The slave medium 62 shown in the drawing is a hard disk in which a central aperture 62a has been opened at the center portion thereof for positioning the slave medium 62 on a rotation support axis of a drive apparatus, and has a recording surface formed of a magnetic layer on both surfaces of a disk shaped base.

Further, a center pin 68b for determining the position of the slave medium 62, taking the central aperture 62a as the standard of reference, is provided at the center of the lower holder 68. The positioning of the lower master medium 63 is also performed by this center pin 68b; a positioning central aperture 63a for insertion of the center pin 68b is opened at the center portion of the lower master medium 63. The positioning of the upper master medium 64 in the upper holder 69 is performed by inserting a center pin (not shown) of the same type as the center pin 68b, that is provided at the center position of the upper holder 69 in a central aperture 64a provided on the upper master medium 64. Further, a mechanism that determines the positions of the lower holder 68 and the upper holder 69 is provided, which serves to match the center positions of the lower master medium 63 and the upper master medium 64.

Figure 10:
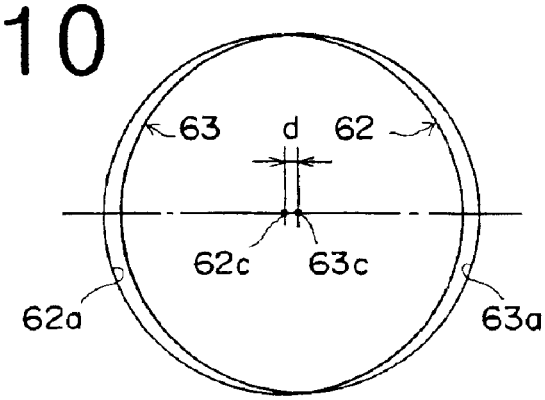
FIG. 10 is a drawing illustrating eccentricity between the center positions.

According to the position matching performed by use of the center pin 68b provided on the holder 68 described above, as shown in FIG. 10, the amount of eccentricity c between the center position 63c of the lower master medium 63 and the center position 62c of the slave medium 62 is set so as to be less than or equal to 100 um. The amount of eccentricity between the center positions of the upper master medium 64 and the slave medium 62 are also set in the same manner so as to be less than or equal to 100 um.

Further, it is desirable that the amount of eccentricity between the center positions of the patterns formed on the master mediums 63 and 64, respectively, and the rotational center position of the slave medium 62 be set so as to be less than or equal to 50 um.

When a magnetic transfer is to be performed, the slave medium 62 is subjected to an initial direct current magnetization in the planar track direction, in the case of planar recording, or in the perpendicular direction, in the case of perpendicular recording, in advance. When performing the magnetic transfer on this conjoined slave medium 62 and master mediums 63 and 64, the transfer magnetic field is applied in the track direction substantially the opposite of the direction in which the initial magnetization has been performed, or in the perpendicular direction.

The lower master medium 63 and the upper master medium 64 are formed as ring shaped disks provided with a transfer data bearing surface, which comprises a pattern formed of a magnetic body, on one surface thereof, which is to be conjoined with the recording surface of the slave medium 62; the surfaces of the master mediums 63 and 64 opposite these data bearing surfaces are vacuum adsorbed by a lower adsorption member 66 and an upper adsorption member 67, respectively.

The master mediums 63, 64 comprise a pliable magnetic layer that covers a micro uneven pattern formed on the surface of a substrate; this surface is the transfer data bearing surface. A synthetic resin, a ceramic material, an alloy, aluminum, glass, quartz, silicon, nickel, or the like is used to form the substrate of the master mediums 63, 64. The uneven pattern can be formed by use of a stamping method or the like. This pliable magnetic layer is formed of a magnetic material by use of a vacuum layer forming means such as a vacuum deposition method, a sputtering method, an ion platting method, or by a metal plating method, etc. A substantially identical type of master medium 43 is used in both planar recording and perpendicular recording.

The lower adsorption member 66 (the same is true of the upper suction member 67) is provided as a disk having a size corresponding to that of the master medium 63, and the surface thereof is formed as an adsorption surface 66a finished to a flatness having an center line average surface roughness Ra of 0.0–0.1 um. Approximately 25–100 suction pores 66b having diameters of approximately 2 mm or less are opened on this suction surface 66a, and dispersed substantially uniformly thereacross. Although not shown in the drawing, these suction pores 66b are connected by a suction channel leading from the interior to the exterior of the holder 68 to a vacuum suction pump that provides the suction force; the back surface of the master medium 63 brought into close contact with the adsorption surface 66a is adsorbed, and the flatness of said master medium 63 is corrected along the adsorption surface 66a.

The lower holder 68 and the upper holder 69 are disk shaped: an upward protruding flange portion 68a is provided on the outer circumference of the lower holder 68, and a downward protruding flange portion 69a is provided on the outer circumference of the upper holder 69. Though the details are not shown in the drawing, the diameter of the outer circumference surface of the flange portion 69a of the upper holder 69 is smaller than the diameter of the inner circumference surface of the flange portion 68a of the lower holder 68, and the flange portion 69a of the upper holder 69 is provided so as to be insertable into the inner circumferential side of the flange portion 68a of the lower holder 68 (the size relation between the respective flange portions can be reversed). Further, a seal element (not shown), which is an O-ring, is installed around the outer circumference of the flange portion 69a of the upper holder 69, and when the upper holder 69 is moved toward the lower holder 68, this seal element slidably contacts the inner circumference surface of the flange portion 68a of the lower holder 68, serving to seal off the surfaces in the direction substantially parallel to that of the separation and contact direction (the axial direction), thereby hermetically sealing the space within the interior of both the lower holder 68 an the upper holder 69. The seal element can also be installed on the lower holder 68.

The holder 61 comprises a lower holder 68 and an upper holder 69 which are provided as a cylindrical structures which are movable in the separation and contact direction in a state in which the interior space between the lower holder 68 and the upper holder 60 are sealed; wherein, even if the thickness of the slave medium 62, and the master mediums 63, 64 changes and the height of the conjoined body formed thereby changes, the sealed state is ensured. The lower holder 68 and the upper holder 69 are connected to a rotational mechanism (not shown) and rotated thereby as an integral unit.

Further, a suction opening of the vacuum suction means is provided on the inner surface of the holder 61, and opens onto the interior space thereof. An air channel connected to this air suction opening is formed within the lower holder 68 or the upper holder 69, and leads to the outside, where it connects to a vacuum pump. By the vacuum suction of air by this vacuum suction means, the vacuum in the hermetically sealed space formed within the holder 61 can be controlled to a predetermined degree.

When the magnetic transfer is to be performed: the upper holder 69 and the lower holder 68 are moved by the pressure accompanying the vacuum suction so as to approach each other; the data bearing faces of the lower master medium 63 and the upper master medium 64 are opposingly conjoined with the respective recording surfaces of the slave medium 62; the magnetic field applying apparatus 65 applies a transfer magnetic field to the conjoined body formed by the master mediums 63, 64 and the slave medium 62 to magnetically transfer and record the data such as a servo signal or the like from the data bearing surfaces of the respective master mediums 63, 64 to the respective recording surfaces of the slave medium 62. Note that as to the method of applying the conjoining force, in addition to the vacuum suction method described above, or in place thereof, it is possible to employ a method wherein external mechanical pressure is applied.

For cases in which planar recording is to be performed, the magnetic field applying apparatus 65 for applying an initial magnetic field and a transfer magnetic field comprises, for example, a ring shaped electromagnetic head disposed on both the upper and lower sides of the conjoined body provided with a core, which has a gap extending in the radial direction of the slave medium 62, around which a coil has been wound, and applies a transfer magnetic field, which is generated in the direction parallel to the track direction, in the same direction from both the upper and lower sides of the conjoined body. The holder 61 is rotated and the transfer magnetic field is applied across the entire surface of the slave medium 62 and the master mediums 63, 64. The magnetic field applying means 65 can also be provided so as to be rotatable. The magnetic field applying means 65 can also be disposed on only one side of the holder 61, or can be a permanent magnet apparatus disposed on one or both sides of the of the holder 61.

Further, for cases in which a perpendicular recording is to be performed, the magnetic field applying apparatus 65 comprises electromagnets or permanent magnets of different polarities disposed on the upper and lower sides of the holder 61, respectively, wherein the transfer magnetic field is generated in the perpendicular direction and applied. If the magnetic field applying apparatus 28 is of the type that applies a magnetic field to only a portion of the surface, the holder 61 or the magnetic field is moved to perform the magnetic transfer across the entirety of the surface.

Next, the magnetic transfer process performed by a magnetic transfer apparatus such as the magnetic transfer apparatus 60 described above will be explained. According to this magnetic transfer apparatus 60, a magnetic transfer is repeatedly performed from the same master mediums 63, 64 to a plurality of slave mediums 62: first, the center positions of the lower adsorption member 66 of the lower holder 68 and the master medium 63, and the upper adsorption member 67 of the upper holder 69 and the master medium 64 are matched, respectively, and the master mediums 63, 64 are adsorbed by the lower adsorption member 67 and the upper adsorption member 67, respectively.

Then, while the upper holder 69 and the lower holder 68 are in the open state, that is, the state in which there is a separation therebetween, a slave medium 62, which has been subjected to an initial magnetization in the planar direction or in the perpendicular direction in advance, is positioned wherein the center position thereof is matched and set; after which the upper holder 69 is moved to approach the lower holder 68 thereby performing the closing operation; by the slidably contacted engagement between the flange portion 68a of the lower holder 68 and the flange portion 69a of the upper holder 9, the space in the interior of the holder 61 is hermetically sealed. The vacuum suction means expels air from the interior space of the holder 61 so as to depressurize said space, and to obtain a predetermined degree of vacuum. In this manner, by the external force (atmospheric pressure) that operates in correspondence to the degree of vacuum on the upper holder 69, conjoining force is added so as to move the upper holder 69 towards the lower holder 68 and sandwich the slave medium 62 between the upper and lower master mediums 63, 64 to conjoin said slave medium 62 and said master mediums 63, 64 uniformly under a predetermined conjoining force.

Then, the upper and lower magnetic field applying apparatuses 65 are made to approach the upper and lower faces of the holder 61, said holder 61 is rotated and a transfer magnetic field is applied, while said holder 61 is rotating, in the direction substantially the opposite of that in which the initial magnetization current was applied. The transfer magnetic field applied when the magnetic transfer is performed is absorbed by the pattern of the protrusion portions formed by the pliable magnetic body of the transfer pattern on the master mediums 63, 64 and conjoined with the respective recording surfaces of the slave medium 2, and as a result: in the case of planar recording, the initial magnetization of this portion is not inverted, whereas the initial magnetization of the other portions is inverted; in the case of perpendicular recording, the initial magnetization of this portion is inverted, whereas the initial magnetization of the other portions is not inverted, and the magnetic pattern corresponding to the transfer pattern of the master mediums 63, 64 is transferred and recorded on the respective magnetic recording portions of the slave medium 62.

According to the current embodiment, a holder 61 configured so as to conjoin a master medium 63 and a master medium 64 are opposingly conjoined with the opposite recording surfaces of a slave medium 62 is provided; wherein, by setting the center positions of the master mediums 63, 64, and the slave medium 62 so that the amount of eccentricity between said respective center positions is less than or equal to 100 um, contact across the entirety of the respective surfaces of the master mediums 63, 64 and the slave medium 62, wherein the contact force at the contact regions of said master mediums 63, 64 and the slave medium 62 is uniform, can be realized, the application of localized contact force can be prevented, and the occurrence of damage to the edges due to contact on only one side can be prevented. Further, by accurately matching the center positions of the master mediums 63, 64 and slave medium 62, a transfer signal having a desired performance level can be recorded.

Figure 11:
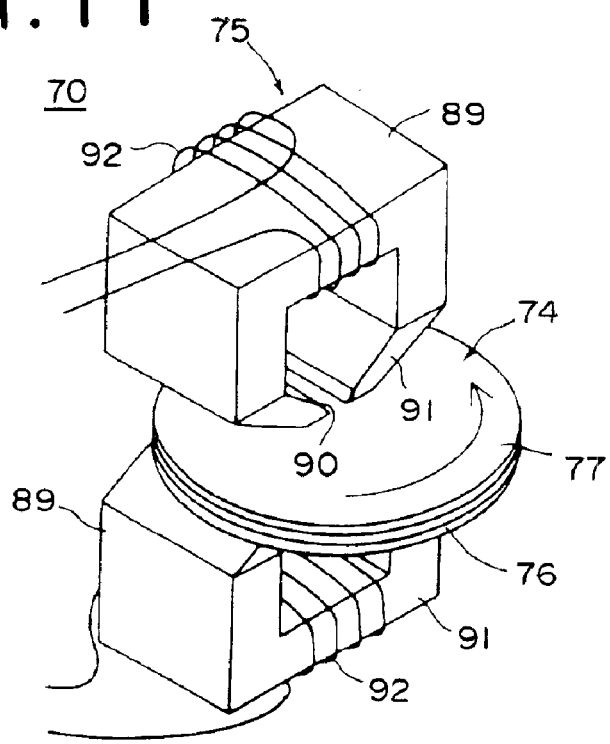
FIG. 11 is a perspective view of the main portion of the transfer state of a magnetic transfer apparatus according to still yet another embodiment of the present invention.
Figure 12:
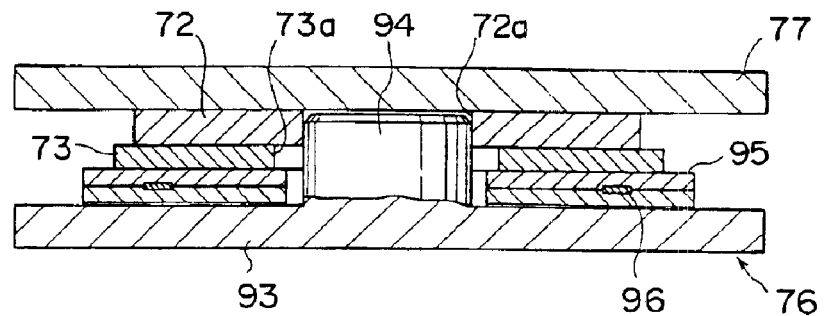
FIG. 12 is a cross-sectional view of a magnetic transfer apparatus in the conjoined state.
Figure 13:
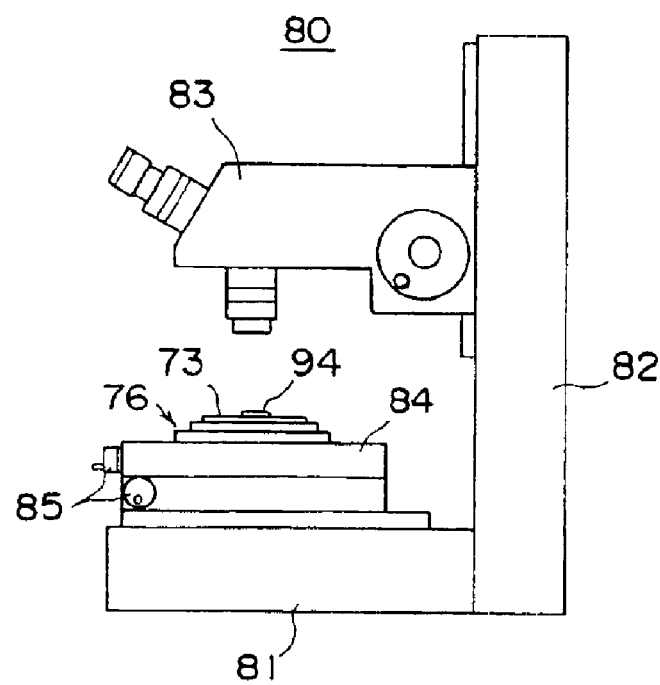
FIG. 13 is a schematic drawing of a measuring microscope for use in adjusting the position of the master medium.
Figure 14:
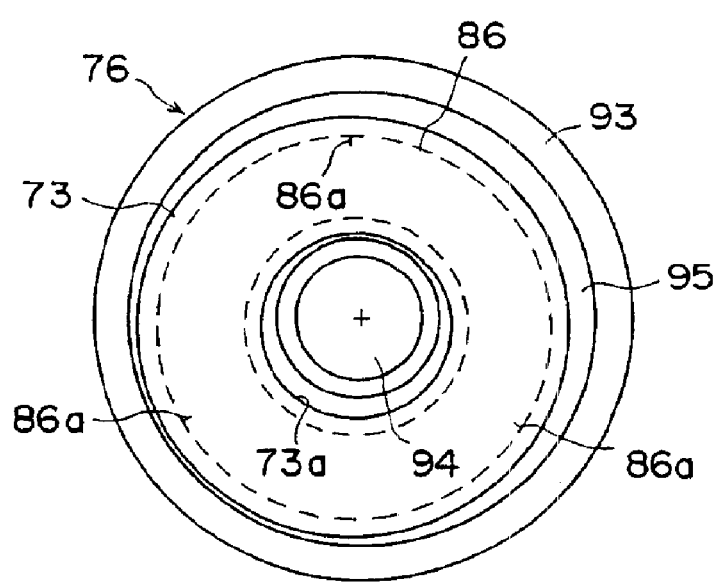
FIG. 14 is a schematic plan view of a master medium in the state prior to the adjustment of the position thereof.
Figure 15:
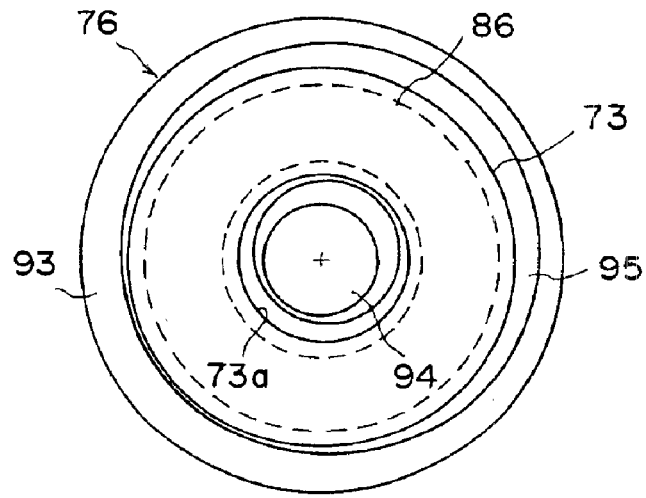
FIG. 15 is a schematic plan view of a master medium in the state subsequent to the adjustment of the position thereof.
Figure 16:
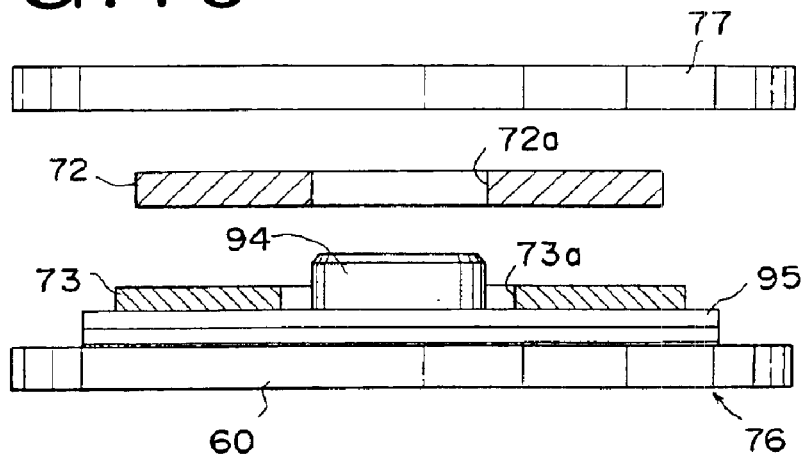
FIG. 16 is a cross-sectional view of the main part of an embodiment of a magnetic transfer apparatus prior to the conjoined state.

Hereinafter, yet another embodiment according of the present invention will be explained. FIG. 11 is a perspective view of the main portion of the transfer state of a magnetic transfer apparatus, which implements the magnetic transfer method according to an embodiment of the present invention, in the transfer state. FIG. 12 is a cross-sectional view of a magnetic transfer apparatus in the conjoined state. FIG. 13 is a schematic drawing of a measuring microscope for use in adjusting the position of the master medium. FIGS. 14 and 15 are plan views of the position adjustment process for a master medium. FIG. 16 is a cross-sectional drawing of the main part of a magnetic transfer apparatus according to the current embodiment in the state before close contact.

The magnetic transfer apparatus 70 shown in FIG. 11 is an apparatus for pressure conjoining, by use of a pressure applying means (a press mechanism), which is not shown in the drawing, the data bearing surface of a disk shaped master medium 73 on which a pattern corresponding to the transfer data such as a servo signal has been formed, and the recording surface of a disk shaped slave medium 62 formed of a magnetic recording medium for receiving the transfer from the master medium, between a first base plate 76 (a rotational base plate) and a second base plate 77 (a pressing member) as shown in FIG. 12 to form a conjoined body, and applying a transfer magnetic field thereto by use of a magnetic field applying apparatus 75 disposed on the upper and lower sides of said conjoined body. The master medium 73 is disposed on the upper portion of the first (lower) base plate 76, and the slave medium 72 is disposed on the lower portion of the second base plate 77, above the master medium 73.

The first (lower) base plate 76 is provided with a slave support axis 94 for positioning the central aperture 72a of the slave medium 72 at the center position of the upper portion of abase member 93, and a master supporting member 95 for supporting the master medium 73 is provided on the outer circumference of this slave support axis 94. The master supporting member 95 is provided so that the position thereof is adjustable in the x, y axes relative to the slave support axis 94.

The position of the master supporting member 95, on which the master medium 73 is being supported, is adjusted so that the center position of the pattern 86 (refer to FIG. 14) formed on said master medium 73 is matched to the center position of the slave support axis 94 and fixed in the matched position as described below; wherein the matching of the positions of said master medium 73 and the slave medium 72 supplied above said master medium 73 are is performed by coupling the central aperture 72a of said slave medium 72 with the slave support axis 94.

The slave medium 72 is a disk shaped recording medium such as a hard disk, on which a magnetic recording layer has been formed on both surfaces thereof. The slave support axis for supporting this slave medium 72 is formed as a protrusion, and the outer diameter thereof is formed so as to be of substantially the same diameter as the central aperture 72a of the slave medium 72; whereby upon the positioning of the central aperture 72a of the slave medium onto the slave axis 94, the center position of said slave medium 72 is supported so as to be matched to the standard centering position of the slave support axis 94. The slave support axis 94 is formed so that the amount thereof protruding above the upper surface of the master medium 73 is less than the thickness of the slave medium 72 (for cases in which a depression portion is formed at the center position of the second base plate 77, the height may be taller).

Meanwhile, the master medium 73 is formed as a ring shape having an inner aperture of which the diameter thereof is larger than the outer diameter of the slave support axis 94, and although it is not shown in detail, the master medium 73 is provided with a transfer data bearing surface on one surface thereof (the upper surface in the drawing), which consists of a micro uneven pattern 86 formed as a concentric to the ring shaped track, and the face opposite thereto (the bottom face in the drawing) is supported on the upper surface of the master supporting member 95.

The base member 93 of the first base plate 76 is formed in a disk shape, and the slave support axis 94 is provided upright at the center portion of the upper surface thereof so as to pass through the lower and upper surfaces of the master supporting member 95. The master supporting member 95 is disposed on the outer circumference of the base member 93 of the first base plate 76, and comprises, for example, guides 96 in two perpendicularly intersecting directions that are provided with an x direction movement portion and a y direction movement portion stacked one upon the other so as to be movable in the x and y direction; wherein the amount of movement in each of the two directions is adjustable by use of an adjustment mechanism (not shown), and each of said x direction movement portion and y direction movement portion can be fixed in position so as to be immobile after the adjustment has been performed. The master medium 73 is supported by suction or the like on the upper surface of this master supporting member 95: for example, a plurality of suction pores is opened on the upper surface of the master support member 95, and the master medium 73 loaded thereon is fixed in place by air suction.

The first base plate 76 is provided so as to be removable from the transfer position; the first base plate 76 is transferred to the measuring microscope 80 shown in FIG. 13, and the center position of the pattern 86 formed on the master medium 73 is adjusted so as to be matched with the center position of the slave support axis 94. Note that the first base plate 76 is rotated by a rotational driving means (not shown).

The second base plate 77 is formed as a disk the same as the first base plate 76; this second base plate 77 constitutes the pressure applying means, and is provided so as to be movable in the vertical direction by a rising and falling mechanism (not shown), wherein the pressure from a cylinder or the like is applied by a mechanism (not shown).

The measuring microscope 80 shown in FIG. 13 comprises: a base 81; and a support post 82 erected on said base 81 perpendicular to the upper surface thereof; and an observation portion 83 formed of an optical system which is supported on said support post 82 and movable in the vertical direction. A stage 84, which is movable in the XY directions, is provided on the upper surface of the base 81; said stage 84 is moved in the x direction and the y direction by the operation of a handle 85. Although not shown in the drawing, the stage 84 is provided with a movement amount detecting means for detecting the amount of movement thereof; a computing portion (a personal computer) performs various computations based on a detection by the detecting means; and a display portion for displaying coordinates and the like.

The first base plate 76 is loaded onto the stage 84 and can be moved while being observed by the observation portion; a plurality of reference points 86a (refer to FIG. 14) or a mark 88 (refer to FIG. 17) are plotted as the base points in the field of vision, a nearly circular shape is described and computations can be performed to derive the center position thereof; the coordinates of said center position are then displayed on the display portion. Further, the center position of the slave support axis 94 is measured in the same manner, and the coordinates thereof are displayed on the display portion. Note that it is preferable, when position matching is performed, to display the amount of deviation between the coordinates of the two center positions.

The positioning of the master medium 73 by use of the measuring microscope 80 will be explained based on FIGS. 14 and 15. First, as shown in FIG. 14, in the state in which the master medium 73 has been loaded onto the master supporting member 95 by a manual operation or the like, the center position of the pattern 86 of the master medium 73 is misaligned with respect to the center position of the slave support axis 94 (in FIG. 14, displaced downward and to the left), and is in an eccentric state. Then, the first base plate 76 is loaded onto the stage 84 of the measuring microscope 80, and by observing with the observation portion 83 and operating the stage 84, the center position of the slave support axis 94 is obtained, and the center position of the pattern 86 of the master medium 73 is obtained in the same manner by, for example, plotting the plurality of starting point signals occurring for the plurality of frames on the outer circumferential track as reference points 86a and performing the computations to obtain the center position of said pattern 86; the positions of both the pattern 86 of the master medium 73 and the slave support 94 are matched by moving the master supporting member 95 in the x and y directions (upward and to the right in the drawing) to adjust the position thereof, wherein by repeating this position adjusting operation, said both center positions can be matched, as shown in FIG. 15, and the master supporting member 95 can then be fixed in the center position matched state.

Figure 17:
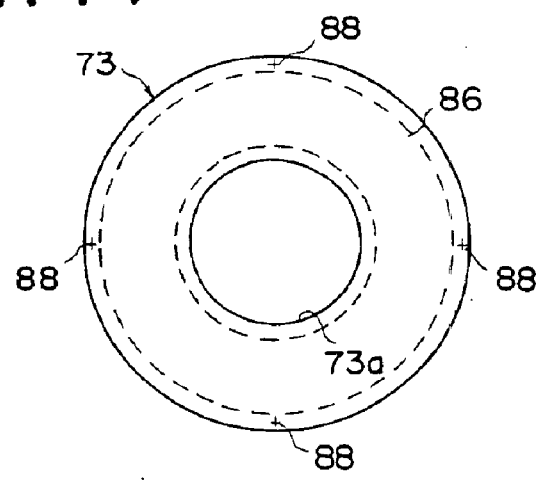
FIG. 17 is a plan view of a master medium according to another embodiment of the present invention.

Note that instead of measuring a portion of the pattern 86 as reference points 86a, as shown in FIG. 17, a position matching mark 88 can be formed together with the pattern 86, and this mark 88 can be measured by use of the measuring microscope 80 and the center position of the pattern 86 obtained. The mark 88 can be, for example, a plurality of points along a circle on the outer portion of the pattern 86, concentric therewith.

The magnetic field applying means 75 shown in FIG. 11 comprises: electromagnetic apparatuses 89, 89 disposed on both upper and lower sides, which are each formed of a core 91 having a gap 90 extending in the radial direction of the slave medium 72 and the master medium 73, around which a coil 92 has been wound; and applies a transfer magnetic field, which is generated in the direction parallel to the track direction, in the same direction from both the upper and lower sides. Note that the magnetic field applying means 75 a can also be configured of permanent magnet apparatuses instead of electromagnetic apparatuses, and can also be disposed on only one side.

When the magnetic transfer field is to be applied, the slave medium 72 and the master medium 73 are rotated as an integral unit, that is, as a conjoined body, and the magnetic field applying means 75 applies a transfer magnetic field thereto while said conjoined body is rotating; whereby the transfer data of the master medium 73 is transferred and recorded onto the entire track circumference of the slave medium 72. Alternatively, the magnetic field applying means 75 can be provided so as to be rotatable. Further, in order to permit the opening and closing operation of the first base plate 76 and the second base plate 77, the magnetic field applying means 75 can be provided so that the electromagnetic apparatus 89 moves away therefrom to a standby position.

Next the operation of the magnetic transfer apparatus 70 described above, that is, the magnetic transfer method will be explained. First, as shown in FIG. 16, the second base plate 77 is raised and maintained in the preconjoinment state, and after the center position of the pattern 86 of the master medium 73 which is supported in the master supporting member 95 of the first base plate 76, has been matched with the center position of the slave support axis in advance in the manner as described above, the slave medium 72 is conveyed onto said master medium 73, and the central aperture 72a thereof is emplaced over the slave support axis 94 and the slave medium 72 is thereby loaded. By performing the position matching by use of this slave support member 94, the center position of the pattern 86 of the master medium 73 can be matched with the rotational center of the slave medium 72 with a high degree of accuracy.

Then, the second base plate 77 is lowered by the pressure applying means, whereby the pressing surface of the second base plate 77 is bought into contact with the upper surface of the slave medium 72, and this slave medium 72 is pressed so that the lower surface thereof (the magnetic recording surface) is brought into close contact and conjoined with the upper surface (the data bearing surface) of the master medium 73 at a predetermined pressure. Next, the both the upper and lower magnetic field applying apparatuses 89, 89 are made to approach the conjoined body formed by the conjoined master medium 73 and slave medium 72, and apply the transfer magnetic field thereto while the first base plate 76 and the second base plate 77 are being rotated substantially one full rotation; whereby the magnetic pattern corresponding to the transfer data borne on the master medium is transferred and recorded on the recording surface of the slave medium 72.

After the magnetic transfer has been completed, the second base plate 77 is raised thereby releasing the pressure, the slave medium 72 to which the transfer has been made is separated from the master medium 73, and removed and conveyed. Then, in a separate process, the slave medium 72 is inverted and again set onto the slave support axis 94, and the opposite surface thereof is conjoined with the master medium 73 and a magnetic transfer is performed in the same manner as described above.

Figure 18:
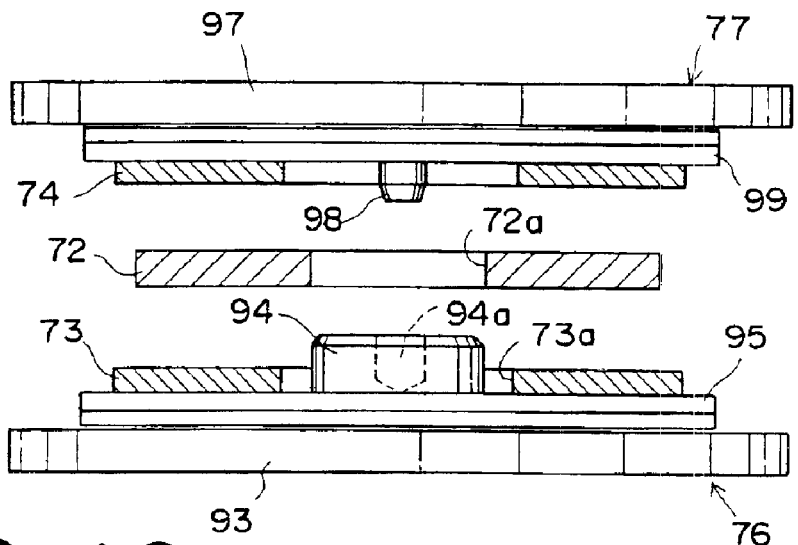
FIG. 18 is a cross-sectional drawing of the main part of another embodiment of a magnetic transfer apparatus prior to the conjoined state.

Further, as shown in FIG. 18, the apparatus can be configured so as to perform the magnetic transfer on both recording surfaces of the slave medium 72 concurrently. The lower-side first base plate 76, in the same manner as described above, is provided with a slave support axis 94 for positioning the central aperture 72a of the slave medium 72 at the center position of the upper portion of a base member 93, and a master supporting member 95 for supporting the master medium 73 is provided on the outer circumference of this slave support axis 94; wherein the center position of the pattern 86 formed on the master medium is matched with the center position of the slave support axis 94. A positioning hole 94a is provided at the center position of the slave support axis 94.

Meanwhile, the second base plate 77 is provided with: a positioning pin 98 at the center position of the lower portion of the base 97 for insertion into the positioning hole 94a of the slave support axis 94; a master supporting member 99 for supporting a master medium 74 on the outer circumferential area of this positioning pin 98; wherein the center position of the pattern 86 formed on the master medium 74 is matched with the center position of the position matching pin 98 and fixed in place at said matched position.

Then, when the magnetic transfer is to be performed, the slave medium 72 is conveyed onto said master medium 73 supported in the master supporting member 95 of the first base plate 76, and the central aperture 72a thereof is emplaced over the slave support axis 94 and the slave medium 72 is loaded; whereby the rotational center of the slave medium 72 and the center position of the pattern 86 formed on the lower-side master medium 73 are matched. Then, the second base plate 77 is lowered to insert the positioning pin 98 into the positioning hole 94a of the slave support axis 94, whereby the rotational center of the slave medium 72 and the center position of the pattern 86 formed on the upper-side master medium 73 supported in the master supporting member 9 of the second base plate 77 are matched. Next, the upper and lower surfaces of the slave medium 72 are conjoined with the respective data bearing surfaces of the lower master medium 73 and the upper master medium 74 at a predetermined pressure, and the transfer magnetic field is applied thereto to concurrently record the magnetic pattern corresponding to the transfer data borne on the respective master mediums 73, 74 to the respective recording surfaces of the slave medium 72.

The slave medium 72 is subjected to an initial magnetization process in advance. This initial magnetization (direct current degaussing) consists of generating a magnetic field of a magnetic field intensity distribution having a magnetic field intensity portion of an intensity equal to or greater than that of the magnetic coercive force of the slave medium 72, on at least one or more positions of the track direction; wherein by rotating the slave medium 72 or the magnetic field in the track direction, the initial magnetization can be performed on all tracks. Further, it is more preferable that a magnetic field of a magnetic field intensity distribution having a magnetic field intensity portion equal to or greater than the magnetic coercive force of the slave medium 72 in only one direction at the position of the track direction, and a magnetic field intensity in the opposite direction less than the magnetic coercive force Hcs of the slave medium 72, is produced by generating a magnetic field of a magnetic field intensity at a portion of the track direction thereof; wherein by rotating the slave medium 72 or the magnetic field in the track direction, the initial magnetization can be performed on all tracks.

Further, the transfer magnetic field is applied in the track direction opposite that in which the initial magnetization magnetic field has been applied; there are no track directions in which the magnetic field intensity exceeds the maximum value of the optimal magnetic field intensity range (0.6–1.3 times the coercive magnetic force of the slave medium 72), and a magnetic field intensity within the optimal magnetic field intensity range is present on at least one or more places in at least one track direction. Further, the magnetic intensity in the opposite track direction is less than the optimal transfer magnetic field intensity in any track direction position across the entire recording surface area of the slave medium 72.

According to the current embodiment, when the magnetic transfer is to be performed: the center position of the pattern 86 formed on the master medium 73 is matched in advance with the center position of the slave support axis 94 and supported in said position-matched position; the slave medium 72 is conveyed onto said master medium 73; by matching the positions of said slave medium 72 and said master medium 73, of which the position thereof has been matched and supported on the slave support axis 94, and then conjoining said master medium 73 and said slave medium 72, the center position of the slave medium 72 and the center position of the magnetic pattern 86 can be matched with a high degree of accuracy, whereby the positional accuracy obtained between the slave medium 72 to which the transfer has been made and the rotational center of the drive apparatus when said slave medium is loaded therein can be raised. Once a master medium 73 has been accurately positioned and fixed in place, a plurality of slave mediums 72 can be supplied to said master medium 73, wherein favorable magnetic transfers can be performed efficiently and successively, while the accuracy of the positioning is ensured, whereby an improvement in productivity can be obtained.

Note that according to the current embodiment, the master supporting member 95 is movable in the X and Y directions. However, for cases in which the master supporting member is a fixed position type supporting member, the master medium 73 can be moved directly to match the position thereof.

Figure 19:
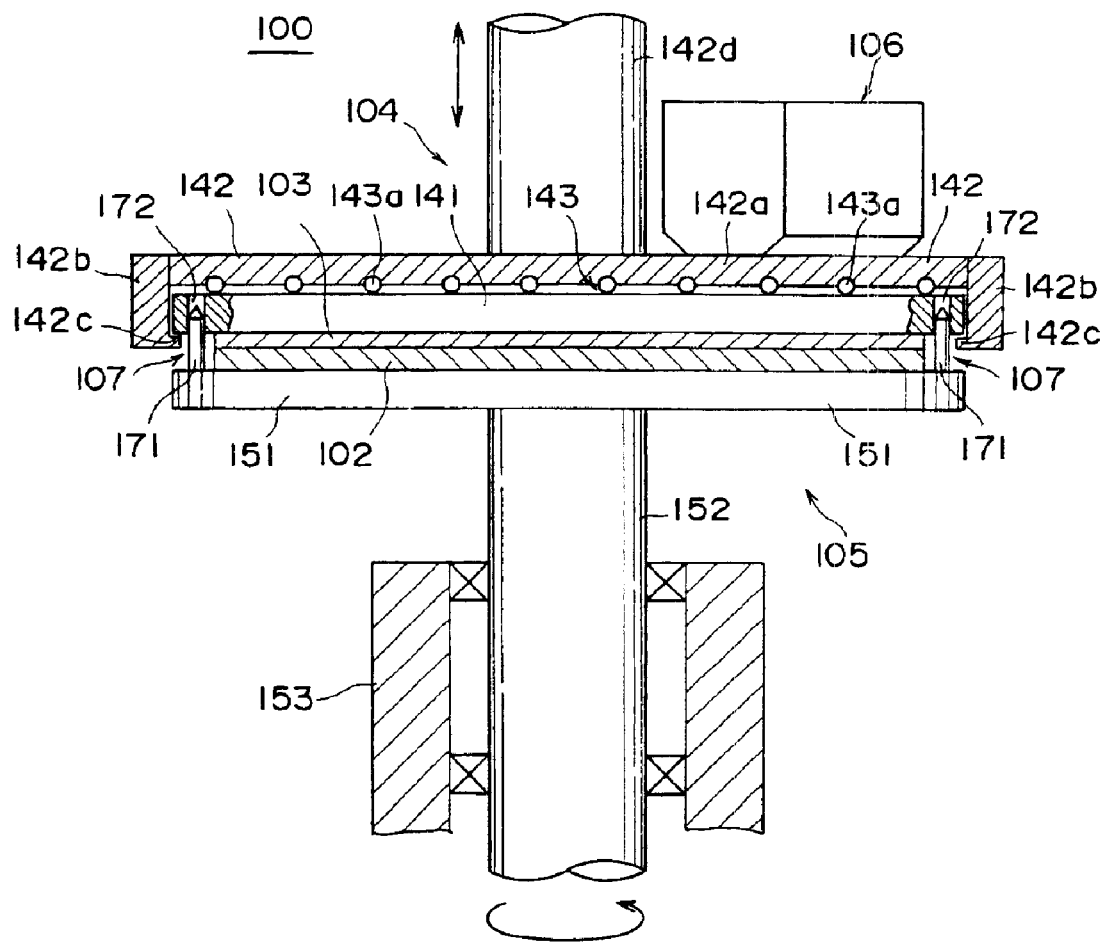
FIG. 19 is a schematic cross-sectional view of a magnetic transfer apparatus implementing yet another magnetic transfer method according to the present invention.
Figure 20:
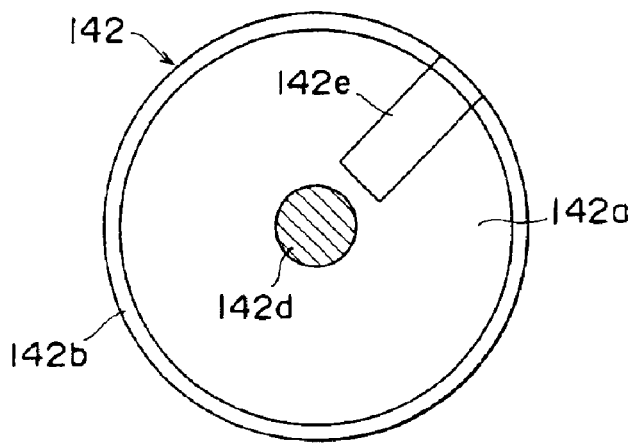
FIG. 20 is a plan view of the pressure base shown in FIG. 19.

Hereinafter, still yet another embodiment of the present invention will be explained. FIG. 19 is a cross-sectional view of the main portion of a magnetic transfer apparatus implementing the magnetic transfer method according to an embodiment of the present invention. FIG. 20 is a plan view of the pressure applying base according to the current embodiment. Note that each of said drawings is a model drawing, wherein the dimensions of the portions shown therein are different from the actual ratios thereof.

According to the magnetic transfer apparatus 100 shown in FIG. 19, which is an apparatus for performing single sided successive magnetic transfers, when a magnetic transfer is to be performed: the slave surface (a magnetic recording surface) of a slave medium 102 (a magnetic recording medium), which has been subjected to an initial magnetization process in advance, is brought into close contact with the data bearing surface of a master medium 103, and conjoined therewith by a pressure applying means 104 at a predetermined pressure to form a conjoined body; this conjoined body is then rotated by a rotating means 105; and a magnetic field applying means 106 applies a transfer magnetic field to said rotating conjoined body to transfer and record the servo pattern signal data borne on the data bearing surface of the master medium 103 to the recording surface of the slave medium 102. According to this magnetic transfer, when the conjoined body formed of the conjoined master medium 103 and slave medium 102 is rotated by the rotational drive of the rotating means 105, the pressure applying means 104 applies pressure so as to not constrain the force component occurring in the rotational direction.

The slave medium 102 is a disk shaped recording medium such as a hard disk, a flexible disk or the like, on which a magnetic recording layer has been formed on both surfaces thereof. The slave medium 102 is subjected to an initial magnetization process in advance. This initial magnetization (direct current degaussing) consists of generating a magnetic field of a magnetic field intensity distribution having a magnetic field intensity portion of an intensity equal to or greater than that of the magnetic coercive force Hcs of the slave medium 102, on at least one or more positions of the track direction; wherein by rotating the slave medium 102 or the magnetic field in the track direction, the initial magnetization can be performed on all tracks. Further, it is more preferable that a magnetic field of a magnetic field intensity distribution having a magnetic field intensity portion equal to or greater than the magnetic coercive force Hcs of the slave medium 102 in only one direction at the position of the track direction, and a magnetic field intensity in the opposite direction less than the magnetic coercive force Hcs of the slave medium 102, is produced by generating a magnetic field of a magnetic field intensity at a portion of the track direction thereof; wherein by rotating the slave medium 102 or the magnetic field in the track direction, the initial magnetization can be performed on all tracks.

The slave medium 102, disposed on the lower side as shown in FIG. 19, is supported on the upper surface of a discoid rotational base plate 151 of a rotating means 105. A rotational axis 152 is provided on the center of the bottom surface of the rotational base plate 151, and the rotation axis 152 is rotatably supported in a bearing member 153. Rotational force from a sprocket (not shown) in a drive motor is transferred to this rotation axis 152 via a transfer member such as a timing belt, a chain or the like, by a mechanism employing a rack and pinion gear or the like, or directly from a motor, a rotary actuator (air or oil pressure), or the like; whereby the rotational base plate 151 is rotated substantially one full rotation at a predetermined speed when the magnetic transfer is to be performed.

The master medium 103 is formed in a disk shape, and has a transfer data bearing surface, which consists of a micro uneven pattern formed of a pliable magnetic layer, on one surface thereof; this data bearing surface is that which is to be conjoined with a recording surface of the slave medium 102. The surface of the master medium 103 opposite that of the data bearing surface is supported on the lower surface of the disk shaped pressing base plate 141 of the pressure applying means 104; this pressing base plate 141 presses the master medium 103 against the slave medium 102.

A pressure applying base 142 is disposed on the upper portion of the pressing base plate 141. The pressing base plate 141 is supported on this pressure applying base 142, and is movable in the contact and separation directions relative to the rotational base plate 151, in the vertical direction. Further, a pressure transfer mechanism that does not constrain the force component in the rotational direction between the pressure applying base 142 and the pressing base plate 141 is provided.

The pressure applying base 142 is provided with a circumferential wall 142*b* extending downward from the outer circumference of a round plate portion 142*a*, and an engaging stopper portion 142*c* is formed on the lower edge portion of this circumference wall 142*b* as a portion protruding into the interior thereof. A rod 142*d* is attached to the upper portion of the pressure applying base 142, and is formed so as to connect with a raising and lowering mechanism (not shown) so as to movable up and down. A plurality of ball bearings 143*a*, which constitutes a pressure transfer mechanism 143, is provided within the bottom surface of the pressure applying base 142. The pressing base plate 141 is provided on the upper portion of the engaging stopper portion 142*c* at the bottom surface of the round plate portion 142*a* of the pressing base 142. The pressing base plate 141 is supported on the engaging stopper portion 142*c* when the pressure applying base 142 is raised, and moved as an integral unit therewith; when the pressure applying base 142 is lowered so as to conjoin the master medium 103 and the slave medium 102, the ball bearings 143a pressure contact the upper surface of the pressing base plate 141 to become thrust bearings and transfer the pressure.

The pressure applying base 142 is fixed in the rotational direction, and the rotation of the pressing base plate 141 and the rotational base plate 151 as an integral unit is permitted by the rotation of the ball bearings 143a. When pressure is applied, the pressing base plate 141 is provided so as to be slightly movable up and down within the pressure applying base 142, so that the engaging stopper portion 142c is separated from said pressing base plate 141.

As shown in FIG. 20, a depression portion 142e is formed on the upper surface of the pressing base plate 141 for insertion of the head portion of a magnetic field applying means 106; said magnetic head is configured so as to approach the contact surfaces of the master medium 103 and the slave medium 102 and apply a transfer magnetic field thereto. It is preferable that the ball bearings 143a are not disposed on the portion of the bottom surface of the corresponding to the depression portion 142e. The ball bearings 143a are provided with springs, and it is preferable that said ball bearings 142a be provided so that all of said ball bearings 143a thrust out and retract so as to contact the upper surface of the pressing base plate 141 and press thereagainst with a uniform force.

Further, the center positions of the rotational base plate 151 and the pressing base plate 141 are determined by a positioning mechanism 107 provided in an area more outward than the master medium 103 and the slave medium 102. In the case of the apparatus shown in the drawing, a plurality of positioning pins 171 are provided upright on the rotational base plate 151, and positioning holes 172 are opened on the pressing base plate 141; the positioning of the center positions of the master medium 103 and the slave medium 102 is carried out by coupling said positioning pins 171 and said positioning holes 172. Further, the rotational force of the rotational base plate 151 is transferred through this positioning mechanism 107 to the pressing base plate 141. The rotational force is transferred by the conjoinment force of the master medium 103 and the slave medium 102. The distal ends of the positioning pins 171 are provided in a tapered form; whereby the coupling thereof with the positioning hole is facilitated.

The magnetic field applying apparatus 106 for applying the transfer magnetic field comprises: an electromagnetic apparatus provided with a core around which a coil has been wound and having a head portion extending in the radial direction of the conjoined master medium 103 and slave medium 102, which are supported in the rotational base plate 151 and the pressing base plate 141; or a permanent magnet apparatus disposed on one or both sides of the conjoined body. The magnetic field applying apparatus 106 applies a transfer magnetic field direction parallel to the track direction, and in the direction substantially the opposite of that in which the initial magnetization magnetic field was applied. Note that the magnetic field applying apparatus 106 is provided at a position wherein it does not interfere with the pressure applying base 142 when it is raised or lowered.

The transfer magnetic field is applied so that there are no magnetic field intensities exceeding the maximum value of the optimal magnetic field intensity range (0.6–1.3 times the coercive magnetic force of the slave medium 102) in any track direction, and a magnetic field intensity within the optimal magnetic field intensity range is present on at least one or more places in one track direction. Further, the magnetic intensity in the opposite track direction is less than the optimal transfer magnetic field intensity in any track direction position across the entire recording surface area of the slave medium 102.

According to the magnetic transfer performed by the magnetic transfer apparatus 100 comprises the steps of: first, raising the pressing base plate 141, on which the master medium 103 has been positioned and fixed in said position, together with the pressure applying base 142; and positioning the center position of the slave medium 102 on the upper surface of the rotation base plate 151 and fixing the slave medium 102 in said position, while in the state in which sufficient space has been opened between the rotation base plate 151 and the slave medium 102 to facilitate the removal and loading operations thereof. Next, the pressure applying base 142 is lowered, and while the positions of the rotation base plate 151 and the pressing base plate 141 are being matched by use of the positioning mechanism 107, the transfer data bearing surface of the master medium 103 is conjoined with the recording surface of the slave medium 102 at a predetermined pressure provided through the pressure transfer mechanism 143. Continuing, the drive motor is activated and the drive axis 152 is driven, whereby the rotational base plate 151 and the pressing base plate 141, which are connected through the positioning mechanism 107, are rotated as an integral unit; at the same time, the transfer magnetic field is being applied to the rotating conjoined body, whereby the transfer data such as a servo signal or the like formed on the transfer data bearing surface of the master medium 103 is magnetically transferred and recorded onto the recording surface of the slave medium 102.

According to the current embodiment, the pressing base plate 141 of the pressure applying means 104, by the action of the pressure transfer mechanism 143 constructed by the ball bearings 143a, does not constrain the force component occurring in the rotational direction when the conjoined body is being rotated and the transfer magnetic field is applied, and the pressing base plate 141 rotates around the rotational center of the rotational base plate 151, independently of the pressure applying base 142, while applying the pressure. In this manner, no drive load due to the rotation is applied to the pressure applying base 142, and the slave medium 102 and the master medium 103 are rotated as an integral unit wherein no slippage occurs therebetween; whereby a magnetic transfer with a high degree of accuracy can be performed.

Figure 21:
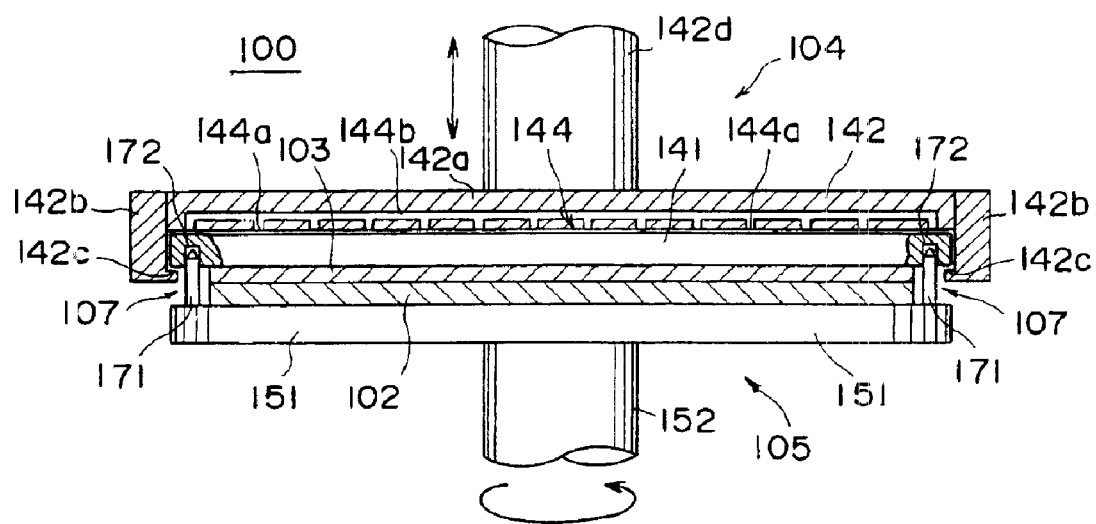
FIG. 21 is a cross-sectional view of the main part of a magnetic transfer apparatus having another embodiment of a pressing force transfer mechanism according to the present invention.

FIG. 21 is a cross-sectional view of the main part of a magnetic transfer apparatus 100 provided with a pressure transfer mechanism 144 according to another embodiment of the present invention.

According to the current embodiment, the pressure transfer mechanism 144 is formed by an air gap. The pressing base plate 141 is structured in the same manner as described above, and is supported between the round plate portion 142a of the pressure applying base 142 and the engaging stopper 142c. A plurality of air expelling pores 144a is opened on the bottom surface of the round plate portion 142a of the pressure applying base 142. An air channel 144b that passes through to the air expelling pores 144a is provided through the interior of the round panel portion 142a; this air channel leads to the exterior portion and connects to a pressurizing source (not shown), and supplies compressed air.

When the pressing base plate 141 has been lowered during application of pressure, said pressing base plate 141 is separated from the pressure applying base 142 by the air expelled from the air expelling pores 144a of said pressure applying base 142, which is expelled toward the upper surface of the pressing base plate 141, and the pressure is transferred in the state in which an air gap has been formed between the pressure applying base 142 and the pressing base plate 141. The rotation of the pressing base plate 141 and the rotational base plate 151 as an integral unit, which is independent in relation to the pressure applying base 142, is permitted by the non-contact sliding mobility provided by the air gap. Otherwise, the components are the same as those shown in FIG. 19, and the magnetic transfer is performed in the same manner as occurred in the embodiment shown therein.

According to the current embodiment as well, the pressing base plate 141 of the pressure applying means 104, by the action of the pressure transfer mechanism 144 constructed by the air gap formed by the expulsion of the pressurized air, does not constrain the rotational force component in relation to the pressure applying base 142 when the conjoined body is being rotated and the transfer magnetic field applied, and the pressing base plate 141 rotates around the rotational center of the rotational base plate 151, independently of the pressure applying base 142, while applying the pressure. In this manner, no drive load due to the rotation is applied to the pressure applying base 142, and the slave medium 102 and the master medium 103 are rotated as an integral unit wherein no slippage occurs therebetween; whereby a magnetic transfer with a high degree of accuracy can be performed.

Figure 22:
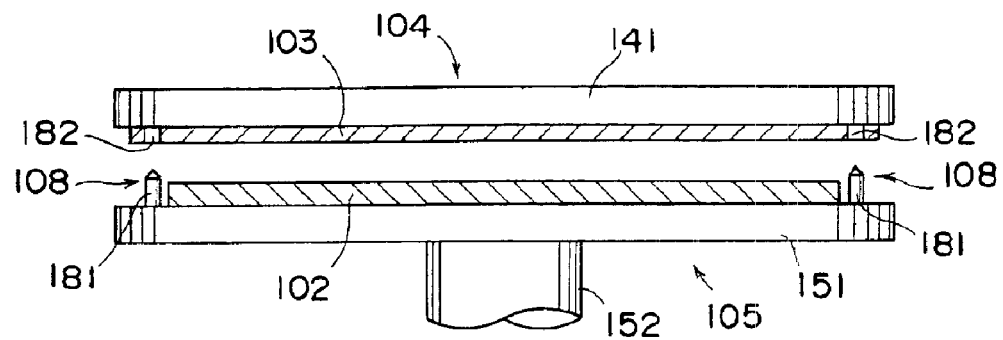
FIG. 22 is a schematic drawing of the rotational base plate and the pressing substrate, which are provided with a positioning mechanism, according to another embodiment t of the present invention.
Figure 23:
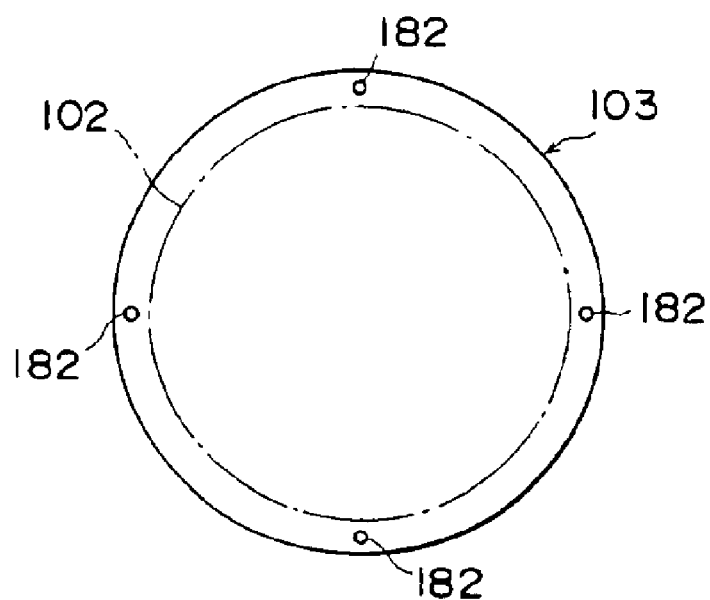
FIG. 23 is a plan view of the master medium of FIG. 22.

Next, FIG. 22 is a drawing of a pressing base plate 141 and a rotational base plate 151 having a positioning mechanism 108 for positioning the master medium 103 and the slave medium 102 according to another embodiment of the present invention, and FIG. 23 is a plan view of the master medium 103 according to this embodiment.

The basic configuration of the pressing base plate 141 and the rotational base plate 151 according to the current embodiment is the same as that shown in FIG. 19. The master medium 103 supported in the pressing base plate 141 is formed so as to have a larger outer diameter than that of the slave medium 102 supported in the rotational base plate 151, and a positioning mechanism 108 for positioning the rotational base plate 151 and the master medium 103 is disposed on the portion of said master medium 103 which is outside of the portion thereof that conjoins with the slave medium 102.

Four positioning pins 181 are erected on the rotational base plate 151 that positions and supports the slave medium 102, and four positioning holes 182 (refer to FIG. 23) are provided on the master medium 103; the positioning pins 181 and the positioning holes 182 constitute the positioning mechanism 108. The distal ends of the positioning pins 181 are provided in a tapered form, and the coupling thereof into the positioning holes 182 is facilitated thereby.

According to the current embodiment, when the conjoining operation is to be performed, the positioning pins 181 of the rotational base plate 151 are inserted into the positioning holes 182 of the master medium 103, whereby the position of the rotational base plate 151, that is, of the slave medium 102 is matched to the position of the master medium 103. In this manner, the complicated positioning operation of matching the position of the pressing base plate 141 and the position of the master medium 103 by use of the positioning mechanism 107 shown in FIG. 19 becomes unnecessary, whereby simplification of the positioning operation can be obtained without a loss in the accuracy thereof.

Figure 24:
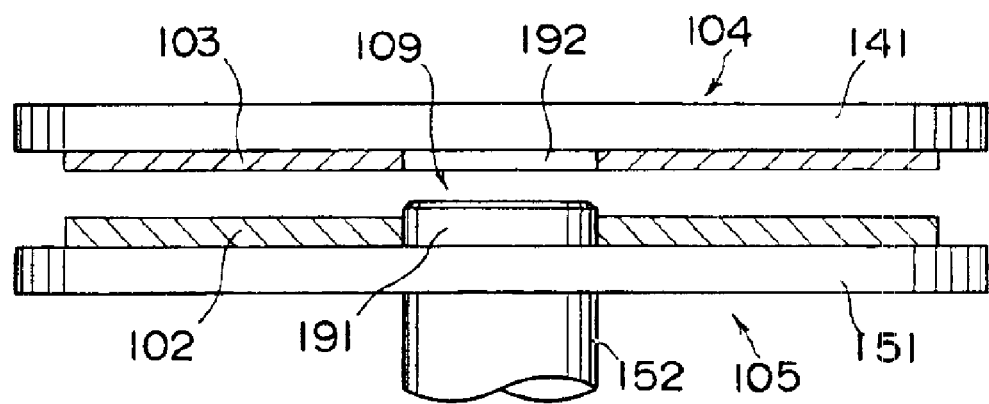
FIG. 24 is a schematic drawing of the rotational base plate and the pressing substrate, which are provided with a positioning mechanism, according to yet another embodiment of the present invention.

FIG. 24 is a drawing of a pressing base plate 141 and a rotational base plate 151 having a positioning mechanism 109 according to yet another embodiment of the present invention. The basic configuration of the pressing base plate 141 and the rotational base plate 151 according to the current embodiment is the same as that shown in FIG. 19. A positioning mechanism 109 for positioning the rotational base plate 151 and the master medium 103 is provided at the center portion of the rotational base plate 151. A large diameter positioning pin 191 is provided upright at the center portion of the rotational base plate 151, and a positioning hole 192 I provided at the center portion of the master medium 103; the positioning pin 191 and the positioning hole 192 constitute the positioning deice 109. The positioning pin 191 passes through the central aperture of the slave medium 102 and protrudes therefrom. The distal end of the positioning pin 191 is provided in a tapered form, and the coupling thereof into the positioning hole 192 is facilitated thereby. Note that the positioning of the slave medium 102 can also be performed by the insertion of the positioning pin 191 of the rotational base plate 151 through the central aperture 102a of said slave medium 102.

According to the current embodiment, when the pressure applying operation is to be performed, the positioning pin 191 of the rotational base plate 151 is inserted into the positioning hole 192 of the master medium 103, whereby the position of the rotational base plate 151, that is, of the slave medium 102 is matched to the position of the master medium 103. In this manner, the complicated operation of matching the position of the pressing base plate 141 with the position of the master medium 103 becomes unnecessary, in the same manner as shown in FIG. 22, whereby simplification of the positioning operation can be obtained without a loss in the accuracy thereof. Further, if the positioning of the slave medium 102 is performed by use of the positioning pin 191, the positioning operation can be further simplified.

Note that in the reverse to the above-described embodiment, the master medium 103 can be supported in the rotational base plate 151 and the slave medium 102 can be supported in the pressing base plate 141. The fixation of the slave medium 102 and the master medium 103 in the pressing base plate 141 and the rotational base plate 151, respectively, can be performed by adsorption by air suction, for which a suction channel is formed. Further, it is preferable that small pores are opened on the portion of the master medium 103 other than that on which the transfer pattern has been formed, so that the air on the contact portion of the slave medium 102 can be suctioned off therethrough, whereby no air remains between the contact surfaces.

Further, as in each of the embodiments described above, there are cases in which one recording surface of a slave medium 102 is conjoined with the data bearing surface of a master medium 103 and a single sided successive magnetic transfer is performed on one side of the slave medium 103, and cases in which both recording surfaces of the slave medium 102 are conjoined with the respective data bearing faces of two master mediums and a double sided concurrent magnetic transfer is performed on both recording surfaces of the slave medium 102. For cases in which the single sided successive magnetic transfer is performed, the slave medium 102 (or the master medium 103) is supported in the rotational base plate 151 and the master medium 103 (or the slave medium 102) is supported in the pressing base plate 141, said master medium 103 and said slave medium 102 are conjoined and a transfer magnetic field is applied thereto. After the single sided successive magnetic transfer has been performed, the opposite surface of the slave medium 102 is conjoined with a master medium 103 on which an opposite surface pattern has been formed, and the transfer magnetic field is applied thereto. For cases in which the double sided concurrent magnetic transfer is performed, a first master medium 103 is supported in the rotational base plate 151 and a second master medium 103 is supported in the pressing base plate 141, the slave medium 102 is supported sandwiched between both of the master mediums 103, 103, and both surfaces of the slave medium 102 are conjoined with the respective surfaces of the master mediums 103, 103, and the transfer magnetic field is applied thereto.

Basically, the magnetic transfer according to the present invention comprises the steps of: performing an initial magnetization of the slave medium 102 in advance by applying a direct current magnetic field in one direction of the track direction thereof; then, conjoining the slave surface (a magnetic recording surface) of the slave medium 102 with the data bearing surface of the master medium 103, which consists of a pliable magnetic layer coated onto the micro uneven pattern formed on the substrate thereof; and applying a transfer magnetic field in the track direction substantially the opposite of that in which the initial magnetization has been performed, to perform the magnetic transfer. As the result, the magnetic pattern corresponding to the contact protrusion portions and the space of the depression portions of the pattern formed by the pliable magnetic layer of the data bearing face of the master medium 103 is transferred and recorded onto the slave surface (the track) of the slave medium 102.

What is claimed is:

1. A magnetic transfer apparatus comprising: a master fixing base for positioning and supporting a master medium bearing a data signal, and a conjoining apparatus for bringing a slave medium that is to receive the transfer of the data signal from the master medium into a state of close contact to with the master medium to form a conjoined body, wherein said master medium is exchanged as a whole along with the master fixing base.

2. A magnetic transfer apparatus as defined in claim 1, further comprising a plurality of the master fixing bases, and a conveyor for sequentially conveying the master fixing bases to the transfer position.

3. A magnetic transfer apparatus as defined in claim 1, further comprising a cleaning means for cleaning dust and debris attached to the surface of a master medium supported in a master fixing base.

* * * * *